(12) United States Patent
Serlet

(10) Patent No.: US 7,730,026 B2
(45) Date of Patent: Jun. 1, 2010

(54) METHOD AND SYSTEM USING REUSABLE STATE INFORMATION FOR SYNCHRONIZATION AND MAINTENANCE OF DATA

(75) Inventor: Bertrand Serlet, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 720 days.

(21) Appl. No.: 10/883,541

(22) Filed: Jul. 1, 2004

(65) Prior Publication Data

US 2006/0069809 A1   Mar. 30, 2006

(51) Int. Cl.
 *G06F 12/00* (2006.01)
 *G06F 17/30* (2006.01)
(52) U.S. Cl. .................................... 707/610; 707/803
(58) Field of Classification Search ................ 707/10, 707/200, 203, 204; 709/248
 See application file for complete search history.

(56) References Cited

U.S. PATENT DOCUMENTS

| | | | |
|---|---|---|---|
| 4,792,909 A | 12/1988 | Serlet | 716/10 |
| 5,287,496 A | 2/1994 | Chen et al. | |
| 5,355,483 A | 10/1994 | Serlet | 711/154 |
| 5,481,721 A | 1/1996 | Serlet et al. | 719/315 |
| 5,490,246 A | 2/1996 | Brotsky et al. | |
| 5,687,370 A | 11/1997 | Garst et al. | 707/206 |
| 5,710,900 A | 1/1998 | Anand et al. | 715/764 |
| 5,710,922 A | 1/1998 | Alley et al. | |
| 5,727,202 A | 3/1998 | Kucala | 707/10 |
| 5,758,358 A | 5/1998 | Ebbo | |
| 5,832,489 A | 11/1998 | Kucala | 707/10 |
| 5,884,323 A | 3/1999 | Hawkins et al. | 707/201 |
| 5,946,689 A | 8/1999 | Yanaka et al. | 707/10 |
| 5,991,771 A * | 11/1999 | Falls et al. | 707/202 |
| 6,000,000 A | 12/1999 | Hawkins et al. | 707/201 |

(Continued)

FOREIGN PATENT DOCUMENTS

EP   0 694 879 A2   1/1996

(Continued)

OTHER PUBLICATIONS

Patent Cooperation Treaty International Search Report, Intl App. No. PCT/US2005/022930, mailed Oct. 27, 2005.

(Continued)

*Primary Examiner*—John R. Cottingham
*Assistant Examiner*—Michael Pham
(74) *Attorney, Agent, or Firm*—Wong, Cabello, Lutsch, Rutherford & Brucculeri LLP

(57) ABSTRACT

A system for synchronization whereby metadata repository maintains information regarding the history and status of data items in a data repository. Data items are associated with states and such states changes (e.g. increment) in response to changes to the data items. History statements associated with the same states describe the changes in a generic enough fashion that multiple data items may be associated with a single state (e.g. if multiple data items share a common history such as that they were all edited by a user on the same device). The history repository is synchronized with other history repositories so as to reflect the states of data items on multiple devices. The synchronized history stores are used during synchronization to identify and resolve data conflicts through ancestry of data item history.

6 Claims, 24 Drawing Sheets

U.S. PATENT DOCUMENTS

| | | | |
|---|---|---|---|
| 6,006,231 | A | 12/1999 | Popa |
| 6,006,274 | A | 12/1999 | Hawkins et al. .............. 709/248 |
| 6,026,415 | A | 2/2000 | Garst et al. ................... 707/206 |
| 6,188,995 | B1 | 2/2001 | Garst et al. ..................... 705/59 |
| 6,272,558 | B1 | 8/2001 | Hui et al. |
| 6,275,831 | B1* | 8/2001 | Bodnar et al. ................ 707/201 |
| 6,295,541 | B1 | 9/2001 | Bodnar et al. |
| 6,304,884 | B1 | 10/2001 | Garst et al. ................... 707/206 |
| 6,308,201 | B1 | 10/2001 | Pivowar et al. .............. 709/214 |
| 6,330,618 | B1 | 12/2001 | Hawkins et al. ............. 709/248 |
| 6,360,272 | B1 | 3/2002 | Lincke et al. ................ 709/238 |
| 6,389,423 | B1 | 5/2002 | Sakakura |
| 6,401,112 | B1 | 6/2002 | Boyer et al. ................. 709/206 |
| 6,457,062 | B1 | 9/2002 | Pivowar et al. .............. 709/248 |
| 6,466,950 | B1 | 10/2002 | Ono |
| 6,505,215 | B1 | 1/2003 | Kruglikov et al. ........... 707/201 |
| 6,516,327 | B1 | 2/2003 | Zondervan et al. .......... 707/200 |
| 6,553,037 | B1 | 4/2003 | Pivowar et al. .............. 370/463 |
| 6,571,262 | B2 | 5/2003 | Garst et al. ................... 707/206 |
| 6,717,599 | B1 | 4/2004 | Olano |
| 6,925,477 | B1* | 8/2005 | Champagne et al. ........ 707/203 |
| 7,216,289 | B2* | 5/2007 | Kagle et al. .................. 715/256 |
| 2002/0049764 | A1* | 4/2002 | Boothby et al. ............. 707/100 |
| 2003/0093431 | A1* | 5/2003 | Cooke et al. ................. 707/100 |
| 2003/0131004 | A1* | 7/2003 | Krishna et al. ................. 707/10 |
| 2004/0186897 | A1* | 9/2004 | Knauerhase et al. ........ 709/209 |
| 2004/0193952 | A1* | 9/2004 | Narayanan et al. ............ 714/13 |
| 2004/0214926 | A1 | 10/2004 | Bittner |
| 2006/0031587 | A1 | 2/2006 | Paterson et al. |
| 2006/0041603 | A1* | 2/2006 | Paterson et al. ............. 707/204 |
| 2006/0066588 | A1 | 3/2006 | Lyon et al. |
| 2006/0069809 | A1 | 3/2006 | Serlet |
| 2006/0288053 | A1 | 12/2006 | Holt et al. |
| 2008/0034009 | A1 | 2/2008 | Freedman et al. |
| 2008/0165807 | A1 | 7/2008 | Nilo et al. |
| 2008/0168183 | A1 | 7/2008 | Marcy et al. |

FOREIGN PATENT DOCUMENTS

| | | |
|---|---|---|
| EP | 1 383 080 A1 | 1/2004 |
| JP | 2000-122907 | 4/2000 |
| JP | 2000-299698 | 10/2000 |
| JP | 2004-86800 | 3/2004 |
| WO | WO 98/45815 A1 | 10/1998 |
| WO | WO 01/06364 A2 | 1/2001 |
| WO | WO 2005/112388 A1 | 11/2005 |

OTHER PUBLICATIONS

PCT Written Opinion of the International Searching Authority, Intl App. No. PCT/US2005/022930, mailed Oct. 27, 2005.

Demers, Alan; Greene, Dan; Hauser, Carl; Irish, Wes; Larson, John; Shenker, Scott; Sturgis, Howard; Swinehart, Dan; Terry, Doug; "Epidemic Algorithms for Replicated Database Maintenance" Xerox Palo Alto Research Center.

A Method of Synchronising Between Three or More Devices; Paterson, Toby; Lebel, Jerome; Patent Application Filed May 24, 2004; Application No. Unknown.

A Method of Synchronising; Paterson, Toby; Lebel, Jerome; Patent Application Filed May 24, 2004; Application No. Unknown.

Abuan et al.; U.S. Appl. No. 10/769,841, filed Feb. 2, 2004.

Demers et al.; "Epidemic Algorithms for Replicated Database Maintenance;" Xerox Palo Alto Research Center; (c) 1987.

Patent Cooperation Treaty International Search Report received in International Application No. PCT/US2005/022930 mailed Oct. 27, 2005.

Patent Cooperation Treaty International Search Report received in International Application No. PCT/US2005/022930 mailed Oct. 27, 2005 .

Babaoğlu et al.; "Consistent Global States of Distributed Systems: Fundamental Concepts and Mechanisms;" Technical Report UBLCS-93-1; Jan. 1993; Laboratory for Computer Science University of Bologna.

* cited by examiner

| Step | Activity | Data | A Status | B Status | C Status |
|---|---|---|---|---|---|
| 0 | None | 0 | 0 | 0 | 0 |
| 1 | User creates B | Blue | 0 | 1(blue) | 0 |
| 2 | User edits B | Bluegreen | 0 | 2 (bluegreen) | 0 |
| 3 | B and C sync | Bluegreen | 0 | 2 (bluegreen) | 2 (Bluegreen) |
| 4 | User edits C | Red | 0 | 2 (bluegreen) | 3 (red) |
| 5 | A & C sync | Red | 3(Red) | 2 (bluegreen) | 3 (red) |
| 6 | User edits A | Orange | 4(Orange) | 2 (bluegreen) | 3 (red) |
| 7 | Sync A,B & C | Orange | 4(Orange) | 4 (orange) | 4 (orange) |

FIG. 5

| Step | Activity | Data | A Status | B Status | C Status |
|---|---|---|---|---|---|
| 0 | None | 0 | 0 | 0 | 0 |
| 1 | User Creates B | Blue | 0 | 1-User creates data item blue on B | 0 |
| 2 | User Edits B | Bluegreen | 0 | 2-User edits data item Blue to Bluegreen on B (bluegreen) | 0 |
| 3 | B and C Sync | Bluegreen | 0 | 2 (bluegreen) | 1-User creates data item blue on B<br>2-User edits data item Blue to Bluegreen on B (bluegreen) |
| 4 | User Edits C | Red | 0 | 2 (bluegreen) | 3-User edits data item on C (red) |
| 5 | A and C Sync | Red | 1-User creates data item blue on B<br>2-User edits data item on B<br>3-User edits data item on C (red) | 2 (bluegreen) | 3 (red) |

*FIG. 6*

| Line # | Pass | Condition | Mapping Table/Device Alpha-Local synchronizing history information from Device B |
|---|---|---|---|
| 1 | First Pass | 5 external command statements found on Beta B1 through B5. Three of the states (B1-B3) already have correspondence established (e.g. "external" commands) in Alpha history Store | A4, external, Beta, B4<br>A5, external, Beta, B5 |
| 2 | Second Pass | B5, user_edited, Beta, B3, B5<br>B10, conflict_resolved, Kappa, B3, B5 | A5, user_edited, Beta, A4<br>A10, conflict_resolved, Kappa, A3, A5 |
| 3 | Second Pass | B16, conflict_resolved, Kappa, B3, B5<br>A16, conflict_resolved, Kappa, A9, A12 | A9, external, Beta, B3<br>A12, external, Beta, B5 |
| 4 | Third Pass | A16, conflict_resolved, B3, B5<br>B13, conflict_resolved, A3, A5 | A13, external, Beta, B16 |
| 5 | Fourth Pass | There is a Beta history statement as follows: B16, conflict_resolved, Kappa, B3, B5 We can localize B3 and B5, but not B16 | ANEW, conflict_resolved, Kappa, A3, A5<br>ANEW, external, Beta, B16 |
| 6 | Fifth Pass | There is a Beta history statement as follows: B18, conflict_resolved, Kappa, B17, B16 Assume Alpha has no corresponding states for B17, B18 and B19 | ANEW1, conflict_resolved, ANEW2<br>ANEW3<br>ANEW1, external, Beta, B18<br>ANEW2, external, Beta, B17<br>ANEW2, external, Beta, B16 |

*FIG. 12A*

| Row | Action | Comment | Client 1410 | Client 1430 | Client 1450 |
|---|---|---|---|---|---|
| 1 | Create Data on Local | Don't know other Clients | New Data A | | |
| 2 | Synch all Three Clients | | | Data A | Data A |
| 3 | Edit Data A on 1410 | Don't know other Clients | Data A' | | |
| 4 | Edit Data A on 1410 again | All Clients need the change to A". 1410 no longer needs the change to A' but it must be maintained because client 1410 doesn't know if it is needed by 1430 or 1450 | Data A" | | |
| 5 | Sync 1410 and 1430 | Upon this synchronization both clients 1410 and 1430 no longer need the change to A', or change to A"", but those are maintained because both 1410 and 1430 know about 1450 and don't know if 1450 needs those states | | Data A" | |
| 6 | Sync All | No Clients need change to A' or A" (states 1 & 2 history statements may be eliminated) | Data A" | Data A" | Data A" |

FIG. 15

METHOD AND SYSTEM USING REUSABLE STATE INFORMATION FOR SYNCHRONIZATION AND MAINTENANCE OF DATA

COMPUTER PROGRAM LISTING

The following table shows the 22 source code files that are provided as computer program listing on a compact disc in read only format and are hereby incorporated by reference.

TABLE 1

Computer Program Listing Appendix

| Date Last Modified | Time Created | Bytes | Name |
| --- | --- | --- | --- |
| Feb. 01, 2004 | 12:14p | 0 | typeattributes.dict |
| Jan. 25, 2004 | 07:22p | 436 | clientnametransformer.h |
| Jan. 25, 2004 | 07:33p | 1,255 | clientnametransformer.m |
| Mar. 11, 2004 | 12:09a | 1,819 | extras.h |
| Mar. 10, 2004 | 11:56p | 7,196 | extras.m |
| Mar. 10, 2004 | 11:25p | 2,018 | mydocument.h |
| Mar. 11, 2004 | 12:21a | 21,579 | mydocument.m |
| Mar. 10, 2004 | 11:08p | 1,015 | myobject.h |
| Mar. 10, 2004 | 11:08p | 6,987 | myobject.m |
| Mar. 10, 2004 | 11:08p | 869 | myobjectview.h |
| Mar. 10, 2004 | 11:47p | 6,946 | myobjectview.m |
| Feb. 21, 2004 | 02:33p | 443 | syncsim.h |
| Mar. 08, 2004 | 08:38a | 4,210 | syncsim.m |
| May 18, 2004 | 09:57a | <DIR> | syncsim.xcode |
| Jan. 01, 1601 | 12:00a | <DIR> | |
| Jan. 01, 1601 | 12:00a | <DIR> | |
| Mar. 11, 2004 | 12:26a | 133,166 | bserlet.pbxuser |
| Mar. 09, 2004 | 09:24a | 14,568 | bserlet0.pbxuser |
| Feb. 01, 2004 | 02:29p | 53,220 | gjf.pbxuser |
| Mar. 11, 2004 | 12:26a | 15,359 | project.pbxproj |
| Mar. 11, 2004 | 12:14a | 4,537 | tuple.h |
| Mar. 11, 2004 | 12:07a | 16,862 | tuple.m |
| Mar. 11, 2004 | 12:14a | 2,885 | tuples.h |
| Mar. 11, 2004 | 12:14a | 27,603 | tuples.m |
| Jan. 18, 2004 | 12:43p | 257 | main.m |
| | 22 File(s) | 348,160 bytes | |

BACKGROUND OF THE INVENTION

Synchronization is a function that provides or maintains consistency between data sets. For example, a desktop computer may have desktop data sets regarding personal information management ("PIM"). A user of that desktop computer may desire to use that PIM data when she is away from her desktop computer. Therefore, she may desire access to the PIM data while using a laptop computer or a personal digital assistant ("PDA") such as a phone or other device like a miniature device. In order to accommodate that desire, her laptop computer and PDA may each carry PIM data sets that correspond to the PIM data sets on the desktop computer. The role of the synchronization function is to give the user a common view of her data on each device. This role is generally accomplished by synchronization events when two or more of the devices synchronize.

A common technique for synchronizing devices is by using snapshots of data at a point in time and comparing current data to the snapshot to determine what has changed. For illustration purposes, refer to FIG. 1 where there is shown a model for two devices, a desktop computer 100 and a portable computer 110. Desktop computer has PIM database 101, which keeps current information for PIM data sets that are edited or added on the desktop computer 100. Desktop computer 100 also has desktop snapshot database, which is a snapshot of the PIM data sets taken at some point in time but typically the time of a prior synchronization (perhaps, the most recent synchronization). Similarly, portable computer 110 has portable database 111 for current PIM data. Having these structures in place, we may attempt to synchronize desktop 100 and portable 110. Typical synchronization occurs by comparing both portable database 111 and desktop database 101 with snapshot database 102. During the compare operation, we can then assemble a list of data items that are new or changed in the active databases 101 and 111 as compared to database 102. Finally, to finish out the synchronization, the list of new and changed data may be used to update all three databases 101, 102 and 111.

A problem occurs in the described synchronization process when corresponding data is changed on both the desktop and the portable. For example, if sometime prior to synchronization Jane Doe's phone number was changed to 877-555-5555 on the Desktop and 800-555-5555 on the portable. During the compare operation (or at another time) the synchronizing system will notice this discrepancy and identify a conflict. In the current art, there is generally no elegant way to resolve this conflict with certainty. Some solutions present an interface to the user and ask her to choose between the two options. Unfortunately, even the user may not remember which piece of data is correct. Other solutions simply create duplicate entries in each database (one with each of the possible data items).

The problem is exacerbated if there are more than two devices carrying the corresponding data sets. For example, referring to FIG. 1, assume that after synchronizing with portable 110, desktop 100 attempts to synchronize with PDA 120. During synchronization, we may discover that PDA 120 carries Jane Doe's phone number as 888-555-555. Unfortunately, in the prior art, we once again have no elegant solution for determining the correct result with certainty. Furthermore, even if we could determine the correct result at this time (e.g. by the user, who remembers), we may be unable to stop the system from having the same problem again the next time portable 110 is synchronized.

Finally, the problem may be generalized for peer-to-peer systems with 3 or more peers. That generalization is that, if peers may synchronize with each other 2 at a time, and a conflict arises there is no way to know if one of the peers carries a more up-to-date data. It is noteworthy, that a time stamp can not resolve the conflict with certainty. This is because as a matter of practical human usage, if two corresponding data items have been changed over the past days or months, that doesn't necessarily mean that the second change is correct. This is especially true if the second change occurred as the result of synchronization with another peer (such "another peer" may have received its data change long ago). Therefore, in the peer-to-peer situation, we would be unable to determine if a detected conflict is, on the one hand, a true conflict, or on the other hand, an apparent conflict that could be verifiably resolved if we understood the history of the data.

Other and related prior art techniques for synchronization may be found in the following U.S. Pat. No. 5,710,922 Method for synchronizing and archiving information between computer systems which is incorporated herein by reference. In addition, the following pending applications "A Method of Synchronising Between Three or More Devices" by Toby Paterson and Jerome Lebel, Ser. No. 10/853,306, filed May 24, 2004 and "A Method of Synchronising" by Toby Patterson and Jerome Lebel, Ser. No. 10/852,926, filed May 24, 2004 are hereby incorporated by reference.

In view of the discussion herein as well as the other problems existing in the prior art, certain embodiments of the invention propose a synchronization system with three goals: (i) to properly synchronize all non-conflicting data; (ii) to detect true conflicts and only present an interface to the user for resolving same if the conflict is true; (iii) to avoid asking an user twice to resolve the same conflict for the same datum.

Applying these goals to the prior art, we may observe that existing synchronization systems meet the first goal in that they generally can accurately synchronize non-conflicting data. However, to satisfy the second and third goals, some type of meta-data must be retained, for example, our reference to a time stamp above. While some prior art systems attempt to use meta-data to accomplish these goals, none fully succeeds.

SUMMARY OF THE INVENTION

The embodiments described herein relate to the use of history information as an aid to synchronization systems and methods. In a very simple embodiment, history information is as little as generation count information that is retained on a per datum basis (datum, in this context, referring to a data item or a collection of data items). The generation count information is synchronized when data is synchronized. The generation count may then be used during synchronization in order to gain a better understanding over the priority of conflicting data.

Other embodiments of the invention use more rich forms of history information regarding data items. In some embodiments, each data item stored on a device is associated with a state. The state changes (e.g. increments) each time the data item is changed. History information is maintained by associating the states with the changes to the data. In some embodiments, the history information is generic in nature so a single statement regarding history may associate with many data items that have experienced the same increment of history. For example, if a user creates 10 data items, some embodiments use only one state to record this history (e.g. user created data on device X). Therefore, each of the 10 created data items may be associated with the same state. If one of the 10 data items were to change, its state would change while the remaining nine items held the old state. The changed data item would then have a state associated with another history statement regarding the change (e.g. user edited data on device X). Furthermore, the first created state would remain an ancestor of the second created state. In this manner, a comparatively few states (and associated generic history statements) may be used to track changes in a very large population of data items.

Assuming multiple devices exploiting the exemplified history maintenance for corresponding data sets, the devices may synchronize history information so that each device understands state information regarding data items on all devices (at least in a temporal sense due to the time of synchronization). Once history information is synchronized, it may serve as a basis for synchronizing data items because the ancestry of a data item may be determined through reference to the history information. For example, if data items conflict during synchronization, the conflict may be resolved by examining history information to determine if one data item is the ancestor or descendant of the other data item.

BRIEF DESCRIPTION OF THE DRAWINGS

FIG. 5 is a generation count example chart.
FIG. 6 is a history data example chart
FIG. 12A is a chart illustrating an embodiment for synchronizing histories.
FIG. 15 is an example of history usage.

DETAILED DESCRIPTION

I. Vocabulary and Non-Limitation

Throughout this disclosure, we shall use certain vocabulary to discuss synchronization techniques and examples. Most of the illustrations discussed will relate to PIM data and the synchronization of same. However, many embodiments of the invention are expressly intended to apply to virtually any kind of data. Some examples of data that may be synchronized using the techniques taught herein are the following: text files; word processing files; files from a file system, media files such as jpegs, mp3, mpeg2, mpeg4, or wav files; records from a database; or any other data file type, whether or not associated with a specific applications.

Retreating then to the language of most of our illustrative embodiments, we shall primarily discuss the invention in terms of PIM data. Generally, we shall discuss devices such as computers, PDAs, phones or other intelligent devices that are used to access PIM data. Each device is generally associated with a synch client, which is usually one or more processes resident on the device. In some instances, a first device will have a synch client resident on another device (this is called a Proxy). This may be because the first device is not sufficiently equipped to host a sync client. Alternatively, in a multi-peer system, the synchronization system may use a local proxy for each other peer in order to synchronize all peers even when many peers are not present (the proxy stands in for the missing devices).

PIM data itself generally occurs as personal contacts, calendar entries, notes, journal entries etc. When we discuss a record, we are generally referring to a set of data items that has been interrelated. For example, a personal contact card for John Doe may be viewed as a record wherein a phone number, street address, pager number and a variety of other data items are interrelated by their common association with John Doe. Each item of PIM data on a single device may have one or more corresponding data items on one or more other devices. For example, John Doe's street address may have corresponding data items on each of Jane Doe's desktop computer, portable computer, PDA, and telephone. Likewise, if our data were digital photographs, a picture of John Doe on the desktop may have corresponding pictures of John on the PDA, the portable computer and elsewhere. It is a job of the synchronization function to provide a common view (as much as possible) of corresponding data across many devices.

II. Sample Hardware and Software Structures

Figure 1:
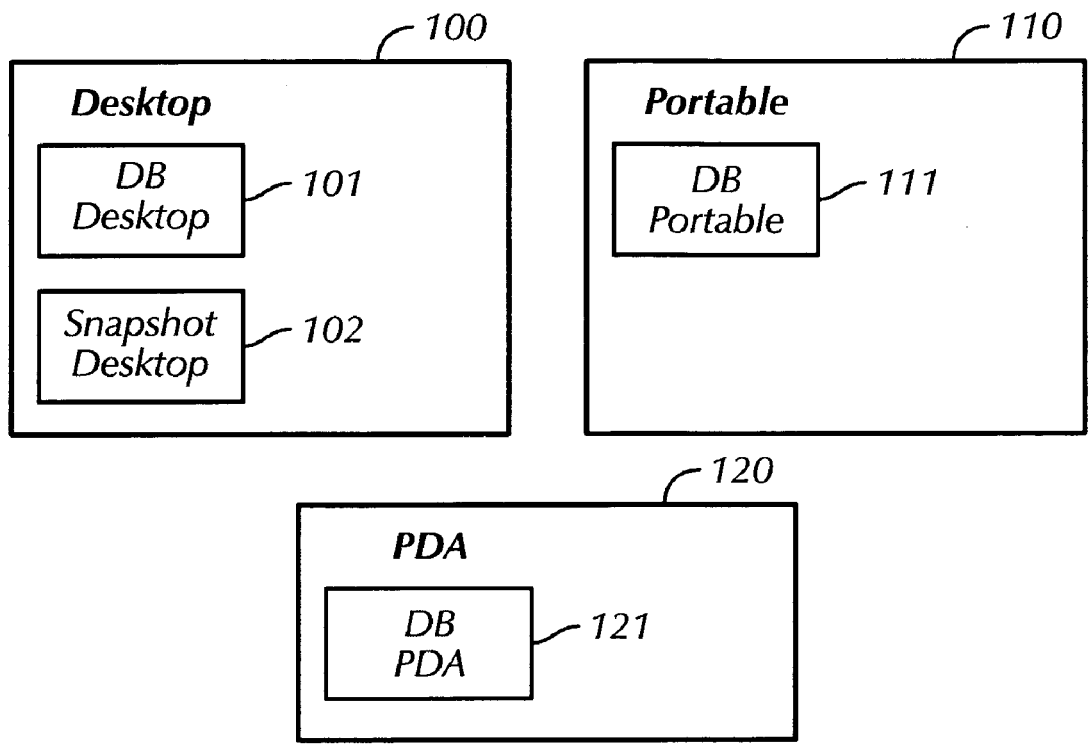
FIG. 1 shows devices that may synchronize.
Figure 2:
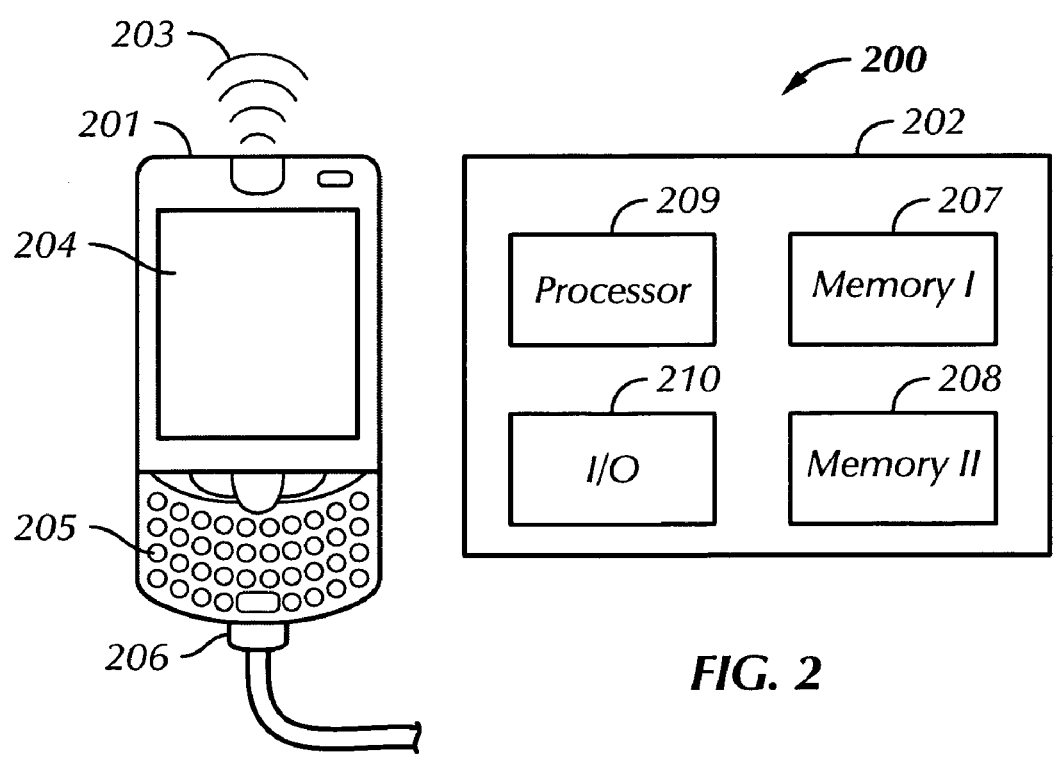
FIG. 2 is exemplary hardware.

While the techniques described herein may be embodied in virtually any structural context, we shall describe some example structural embodiments for illustrative purposes. Referring to FIG. 2, there is shown a sample portable device such as a PDA or telephone handset. As stated earlier, a client device may be embodied in any item with sufficient intelligence to serve to allow users to access or edit data. Therefore, the device of FIG. 2 is intended to illustrate, without limitation, a sample of any such device. Front view 201 of device 200 shows screen 204 that may be used for viewing or accessing data as well as inputting data (in the case of a touch-sensitive or otherwise input-equipped screen). Keypad 205 may also be used for data input such as by alpha-numerics or otherwise and wired connection 206 may be used for power and/or data transport. Wireless port 203 may be infrared, Bluetooth, 802.11 or any other wireless transmission for moving data in and out of device 200. Turning now to inside 202 of device 200, we see that a processor 209 is present for performing processing tasks. The inventive embodiments may incorporate any type of device so processor 209 may be any type of microprocessor or controller or aggregate of components that perform the function of running software for effecting one or more of the device functions. Device 200 may also have two or more types of memory for storing data and programs as shown by memories 207 and 208. These memories may be of any type such as magnetic memory, optical memory or any of the many types of silicon-based memory such as SRAM and DRAM. Finally, device 200 may have components 210 to support I/O functionality such as that potentially embodied in wired connection 206 and wireless connection 203.

Figure 3:
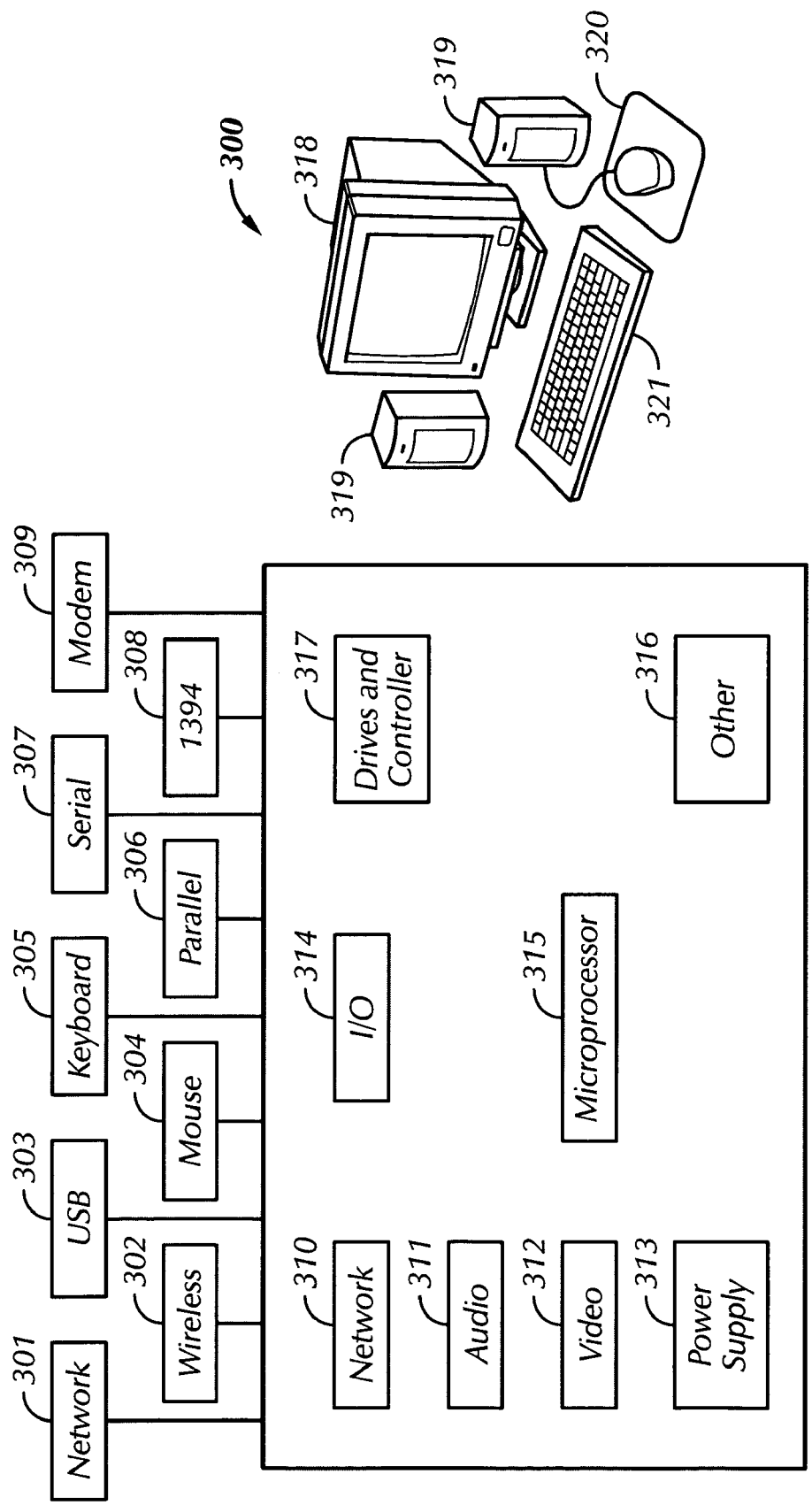
FIG. 3 is exemplary hardware.

Referring now to FIG. 3, computer 300 is another illustration of a device that a user may use in conjunction with many of the disclosed techniques. Computer 300 is an ordinary computer, like a personal computer, but not intended to be limited as such. Computer 300 has one or more microprocessors 315 and accompanying chipset (not shown) at the heart of the system. The chipset may include items such as network unit 310, audio unit 311 and many I/O functions such as those that might be embodied in I/O unit 314. Of course, any of these functions, or sub-functions, may be implemented individually or collectively within a chipset or outside. Computer 300 also has power supply 313 for adapting and supplying power. Computer 300 may have any variety of optical and magnetic drives and the appropriate controllers to use those drives such as IDE, ATA or SCSI controllers. For user accessibility, computer 300 has monitor 318, speakers 319, keyboard 321 and mouse 320 optional tablet/touch screen. Finally, computer 300 may connect with any manner of other items (such as other devices carrying corresponding data items) through various ports (Network 301, wireless 302, USB 303, parallel 306, serial 307, 1394 308 or modem 309).

Transitioning from sample hardware, we shall now discuss general software background. In particular, referring to FIG. 4, there is shown a software stack intended to be illustrative of the software architecture in which some embodiments of the invention will reside. Like our hardware examples, this structure is not intended to be exclusive in any way but rather illustrative. This is especially true for layer-type diagrams, which software developers tend to express in somewhat differing ways. In this case, we express layers starting with the O/S kernel so we have omitted lower level software and firmware. Our notation is generally intended to imply that software elements shown in a layer use resources from the layers below and provide services to layers above. However, in practice, all components of a particular software element may not behave entirely in that manner.

Figure 4:
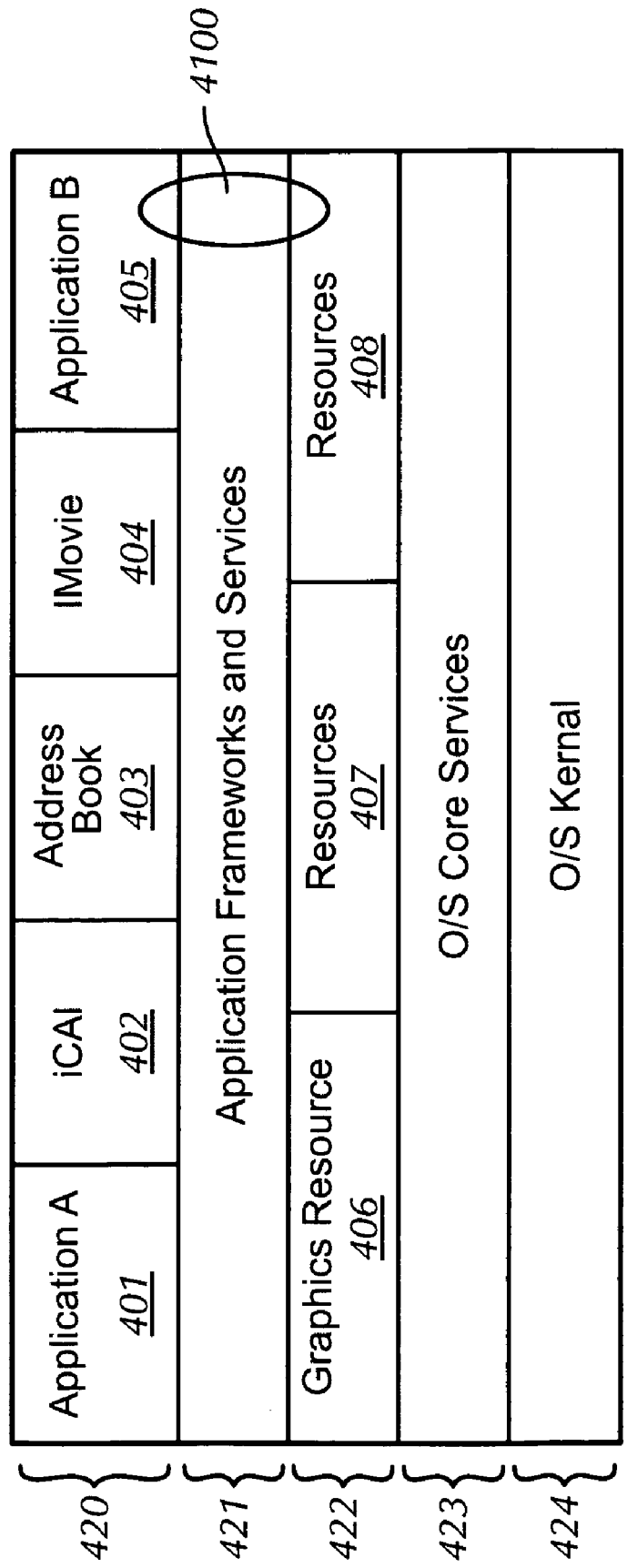
FIG. 4 is an exemplary software stack.

With those caveats, we see in FIG. 4 two layers 424 and 423 dedicated to the operating system kernel and core services respectively. Generally above core services layer 423 there are software layers (422 and 421) for providing higher level resources and services to applications in the application layer 420. Putting the layer diagram in context, we would generally expect to find PIM type software in the application layer 420. For example there is iCal application 402 and Address Book application 403 residing in the application layer. iCal 402 and Address Book 403 are application programs that manage PIM data and present a user interface that allows a user to access, edit or manipulate that data. These application layer services are a type of sync client in that a synchronization function provides services to these clients by maintaining a common view (as much as possible) of data among designated clients. Area 4100 shows generally where processes implementing the synchronization function may be located in many embodiments. In more particularity, a process implementing the synchronization function may be a peer to its application clients or may reside in a layer below, possibly even masking itself to the application (referring to a synch client that doesn't know it's a sync client). The sync function may also have components in two or more layers. In many embodiments, however, the application level synch clients provide a user interface to configure and exploit the synchronization functions, therefore the synchronization processes appear as an integrated feature in client software. In addition, the synchronization processes typically may present their own user interface for configuration and control that is independent of any particular application. Lastly, as discussed earlier, sync clients may exist as a proxy for an external device. Such a proxy process has less need for a user interface and generally (but not necessarily) exists in the higher layers of the software stack

III. Retaining Meta-Data Indicative of Data History a. Generation Counting

Many of the problems of the prior art may find resolution by maintaining data history information for each data set or data item. In one simple form, practiced in some embodiments, a generation count may be maintained. In particular, each time a data is changed, a generation count may be incremented to indicate that change. In yet greater particularity, generation counts may be maintained for any level of data set; i.e. per PIM database, per data class database, per record, or per data item. The generation count may be conceptualized as meta data and thus may be associated with data by any known technique. For example, in many embodiments the generation count is maintained per each data item and is stored with the data. As stated, other embodiments may use other techniques such as data structures associated with the data item or some aggregation of data items.

The technique of using history-indicative information (such as generation counts) may be further enhanced if the history indicative information is synchronized with the data. In some embodiments, during the synchronization process, a generation count may be synched, thereby maintaining a thin version of data history across multiple client peers. As an example, assume we are synchronizing a three-peer system using generation counts associated with each data item. Referring to FIG. 5, there is shown a table that illustrates aspects of synchronizing client A, client B and client C. In particular: the first column, labeled "Step" is for illustrative reference so that we may refer to a line of activity without confusion; the second column, labeled "Activity" states an action that causes a data item change; the third column, labeled "Data" shows the intended data value from the perspective on the omniscient; the fourth, fifth and sixth columns show the status of the data and generation count after each listed activity from the perspective of the respective clients A, B and C.

Referring then to FIG. 5, step 0, we see that the corresponding data items for devices A, B and C are empty and there has been no activity with respect to that data item. In fact, this status may represent either an empty data item or the temporal non-existence of the data items. Referring to step 1, a user creates data on device B, the data is "Blue." The generation count is 1 (shown in the B Status column, and devices A and C remain ignorant of this change). In step 2, the user edits the data from "Blue" to "Bluegreen" (obviously, on device B); the generation count increases to 2, and devices A and C remain similarly ignorant. In step 3, device B synchronizes with device C; the status of the data remains "Bluegreen" and both devices B and C know the correct data and correct generation count (2); device A remains ignorant. Now, in step 4, the user edits the data on device C so the state (generation count) is incremented to (3) and the correct data changes from "Bluegreen" to "Red." Device A remains ignorant of all occurrences and device B holds old data and an antiquated state (generation count) (2). Next in step 5, devices A and C synchronize resulting in device A gaining awareness of the correct data and generation count (device B remains antiquated on both). In step 6, the user edits on device A, changing "Red" to "Orange" and reaching a new highest state (generation count) (4). Finally, in step 7, devices A, B & C all attempt to sync together. The result will be generation 4 and orange. However, it is worth noting that, without carrying the generation counts, this three-way synchronization may have generated an unnecessary conflict.

b. Maintaining More Rich Indications of Data History

In practice, there are significant uses for maintaining an indication of history that is richer than a simple generation count. For example, in many embodiments of the invention, detailed historical data is maintained. Referring to FIG. 6, there is shown a table that illustrates aspects of synchronizing client A, client B and client C using more detailed per-data item history. In particular: the first column, labeled "Step" is for illustrative reference so that we may refer to a line of activity without contusion; the second column, labeled "Activity" states an action that causes a data item change; the third column, labeled "Data" shows the intended data value from the perspective of the omniscient; the fourth, fifth and sixth columns show the status of the data and history information after each listed activity from the perspective of the respective clients A, B and C.

Referring then to FIG. 6, step 0, we see that the corresponding data items for devices A, B and C are empty and there has been no activity with respect to that data item. In fact, this status may represent either an empty data item or the temporal non-existence of the data items. Referring to step 1, a user creates data on device B, the data is "Blue." The facts with respect to the step one transaction are retained on device B. Next, in step 2, the user edits data on device B as indicated. The history is recorded on device B. In step 3, devices B and C are synced, resulting in a synching of the data (bluegreen) as well as the history facts for the data item. In the next step (4), the user edits the data item on device C, changing the data to "Red." Now, when devices A and C sync in step 5, the entire history of the data item is conveyed to device A. We see from this example that each device carries all or a portion of the data item history.

Therefore, the history may be exploited to make intelligent decisions about the data. One example of such a decision is, in the situation of an apparent conflict, the devices may determine whether one version of the data item is an ancestor of another. This can be very useful in many cases, such as that of truncated data. Truncated data may occur when a fat device such as a desktop computer synchronizes with a thin device such a phone. If the phone is not capable enough to carry all of a data item (or all of a set such as a record), the data from the desktop computer is truncated for inclusion in the phone database. Later, the phone may synchronize with another device, such as a PDA, and convey the truncated data. If the PDA and desktop attempt to subsequently synchronize, they will encounter a conflict that only specific history data can resolve.

c. Sample Platforms for History-Based Synchronization

We have generally discussed the use of history based metadata for improving and enhancing synchronization techniques. For illustrative purposes, we shall discuss some sample inventive embodiments placing these techniques in structural contexts. One advantage of these inventive embodiments is that they don't necessarily require the independent maintenance of a data snapshot after a prior synchronization. More specifically and as explained earlier, many existing synchronization systems retain a snapshot of data after each synchronization. That snapshot must be maintained independent of user edits because, the snapshot is used during the next synchronization to determine what data has been added changed or deleted. By contrast, many embodiments of the current invention do not require the enduring maintenance of such a snapshot. In particular, no separate snapshot may be necessary if the system dynamically updates both history information and corresponding metadata at the data item. This is possible because history data provides an alternative and more comprehensive method of determining what data is truly new. Alternatively, some embodiments of the current invention may avoid maintaining an enduring snapshot by simply generating a snapshot just prior to synchronization and disposing the snapshot after synchronization is complete.

Figure 7A:
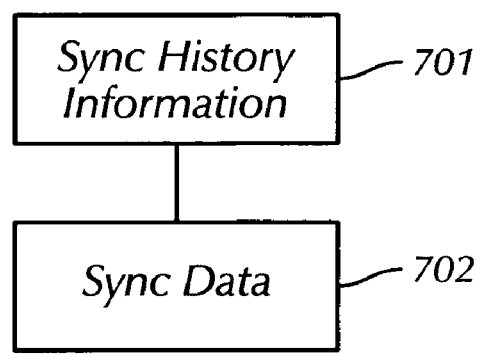
FIG. 7A is an exemplary synchronization process.
Figure 7B:
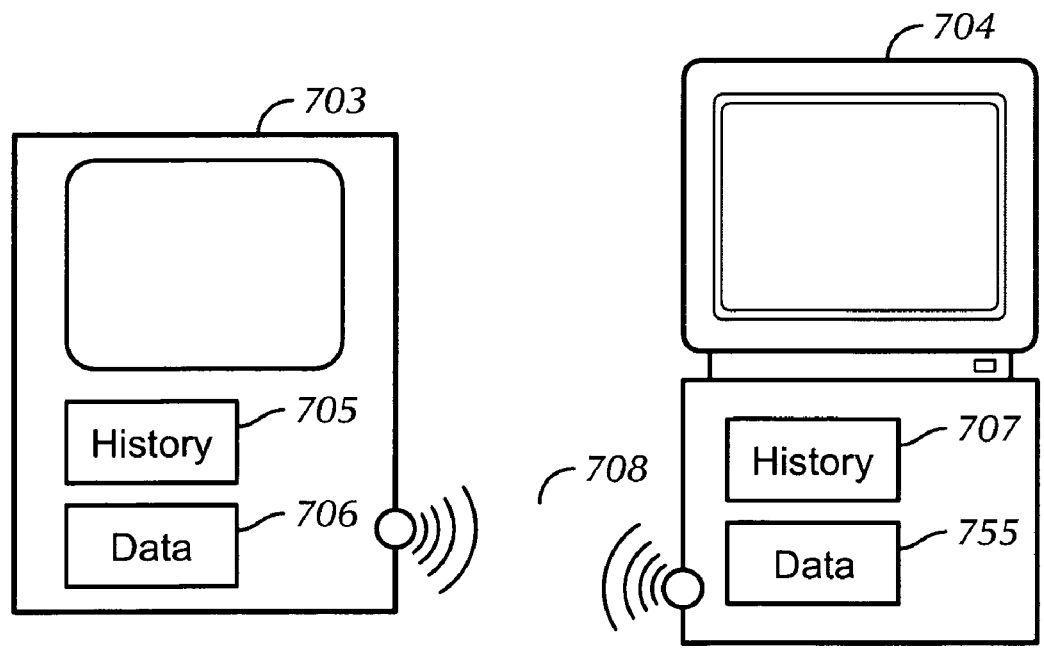
FIG. 7B is exemplary device synchronization.
Figure 7C:
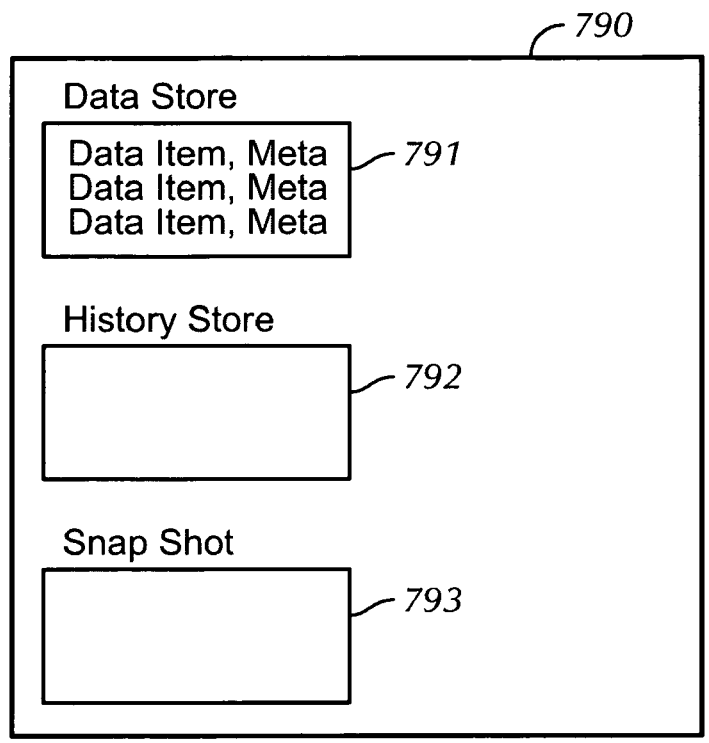
FIG. 7C is illustrative data structure arrangements.

Referring now to FIG. 7C, there is shown sync client device 790. Within device 790 there is shown a conceptualization of potential data structures that may be used to implement an embodiment of the invention. The data structures may be stored in any suitable place accessible to a client device. As discussed earlier, some examples are SRAM, DRAM, magnetic or optical memory. The data structures needn't be stored in the same memory type or place. Referring now to device 790, data store 791 is intended to represent the live database for use interacting with the user interface. There are many ways to implement such a structure in the current art. Such implementations may be in a single file or many files. The files may be flat tables, soup-type files or combination or other type of file that is suitable. For example, in the context of PIM data, often there is an independent soup or flat file for each data class managed by the associated PIM programs. In any of those events, the data store 791 maintains actual data and some metadata. The metadata data may be as little as an ID code, or as much as a full history of the data. The use of the term metadata is not intended to preclude the use of this data for user access or manipulation. In some embodiments, the metadata accompanying a data item in the data store 791 is a state identification and optionally a data item ID.

History store 792 is intended to represent a data structure for maintaining history information regarding the data sets or data items in the data store 791. This history information can be in any form consistent with the discussion herein. In addition, the monicker "history information" isn't intended to preclude the use of information that is not related history. History information may include any metadata useful under the disclosed techniques. Furthermore, the history information may be associated with data items using any suitable technique such as ID codes, virtual or physical location or a separately stored association device such as a table or database. In some embodiments, information in the history store is associated with data sets or data items using state identification and/or a data item ID. In greater particularity, in some embodiments, data items are associated with a state (e.g. kept as meta in the data store 791). In certain of those embodiments, many data items may have the same state. History information is associated with that state 0 by using corresponding state ID in the history store 792. For example, in some embodiments, a user on device A may create 10 (or even 10,000) data items in an otherwise empty data store. The added data items may represent only a single state—the ID for state accompanied by history information that the user edited data on device A. Taking the example deeper, if the user on device A were to edit three of the 10 created data items, a second state would be reflected in the history store 792 to reflect the history of those three data items. (They would be, for example, at state whereas the unedited 7 items would be at state 1.)

Moving now to snapshot 793, this represents a data structure that may be used for a temporal snapshot of the all or a portion of the data store. As discussed earlier, certain embodiments may exploit an independent snapshot during or prior to synchronization. As discussed earlier with respect to the data store 791, both the history store 792 and the snapshot 793 are flexible as to implementation regarding data structures and physical memory. Furthermore, data store 791, history store 792 and snapshot 793 may be implemented in the same data structure; or in three separate data structures; or in one or more data structures; or any combination of the foregoing.

IV. State Based Synchronization

As discussed earlier, many embodiments of the invention exploit state based synchronization techniques whereby a state identification is associated with each data item or data set. In these embodiments, states represented in the data store are also represented in the history store. Within the history store, states are associated with facts about the data items, including without limitation, facts about the history of the data item. In a multi-peer system, each client device maintains a data store and/or a history store. When a data item is added or edited (including deletion) on a particular device, that data item is assigned a new state and an entry is potentially made in the history space to reflect the state change of the item. The reason, the entry in the history space is only "potential" is because the new state of the added or edited data item may already be reflected in the history store by a statement created in conjunction with a state change of another data item. So it is clear that state and their accompanying metadata in the history store may simultaneously apply to several data items. Furthermore, it is desirable in many embodiments to minimize the amount of information in the history store.

a. General Synchronization Example

Assuming peer sync clients operating as described, ultimately there maybe a desire to synchronize any two of such sync clients. In some embodiments, synchronization is performed in an asymmetrical fashion. In particular, a first device synchronizes its data store with a second device, and then the second device may separately synchronize its data store with the first device. For many embodiments, the actual process of synchronization involves two very general steps shown in FIG. 7A. The first step 701 is to synchronize the information in the history stores (e.g. metadata describing state changes of the data items). The second step 702 is to synchronize the data items in the data store. Since the history information is synchronized first, the new history information in the history store may be used to aid in synchronizing the data store.

Generally, the history information may be synchronized in several different ways. Referring to FIG. 7B, there is shown a pair of devices performing a one way synchronization from device 704 to device 703. Probably the simplest way to sync history items is to transfer all the history items from device 704 to device 703. The transferred history items may be evaluated on device 703 to determine which of those items require representation in the history store 705. Another technique for synchronizing the history information is for devices 704 and 703 to enter a dialog over any suitable communications mechanism, such as wireless link 708. In one manner of dialog, device 703 may query device 704 about the contents of device 704's history information or facts regarding that history information. With the responses to those queries, device 703 may then either create necessary history information in store 705 or request necessary information from device 704 and place it in store 705. In another manner of dialog, device 704 may query device 703 regarding history information in store 705. Device 704 may then determine and send whatever, if any, history information is required by device 703.

Figure 8:
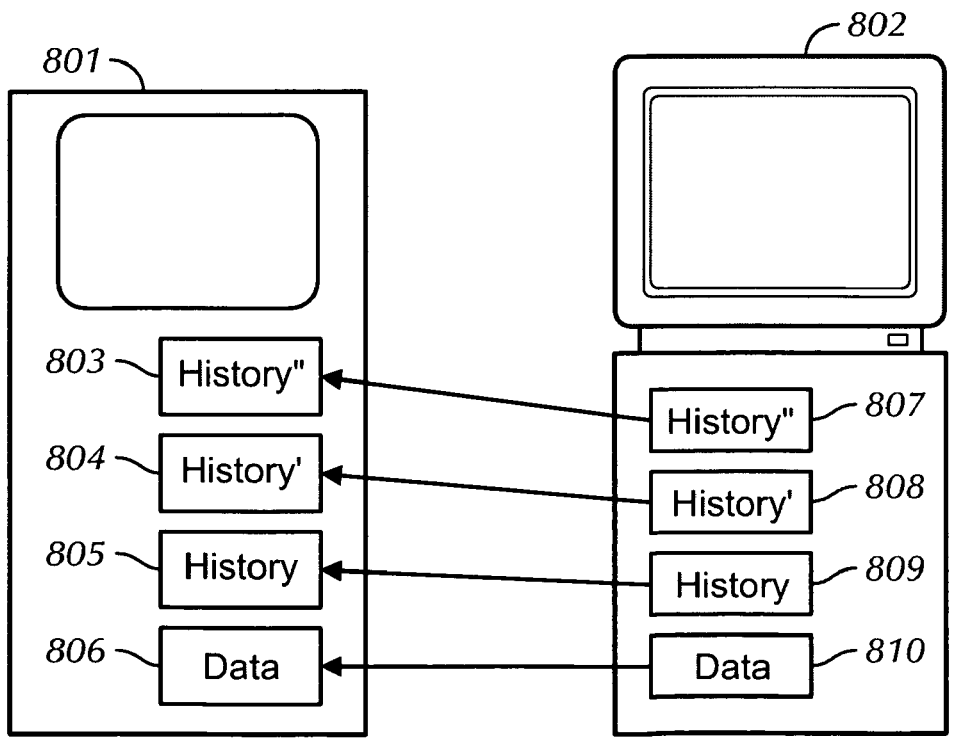
FIG. 8 is exemplary system for recursive application of state-based synchronization.

A third technique for synchronizing the history information is to recursively exploit a state based synchronization technique to the history information. Referring to FIG. 8, there is shown a pair of devices performing a one-way synchronization from device 802 to device 801. As shown in FIG. 8, recursive use of state based synchronization may require multiple history stores. Device 801 has primary history store 805, secondary history store 804 and tertiary history store 803. Device 802 has primary history store 809, secondary history store 808 and tertiary history store 807. As discussed with respect to other data structures, the history stores on each device many exist in any type of memory and may be implemented in one or several data structures of varying types. In order to perform recursive state based synchronization, each element (e.g. factual statement or group of factual statements) in a primary history store 805 or 809 is assigned a state; such state also associated (in secondary history stores 804 or 808) with information regarding state changes occurring to the elements in the primary history stores 805 and 809. This is secondary metadata for maintaining primary metadata. Of course, one can recursively nest the technique as many times as efficiency dictates. For example, tertiary history stores 803 and 807 may carry tertiary metadata to aid in the synchronization of secondary metadata in history stores 804 and 808. When synchronizing an implementation with nested history stores, the order of synchronization may be in the reverse of the hierarchy of the history stores. For example, if all the history store in FIG. 8 were exploited, the tertiary pair 803-807 may be synchronized first. The result of that synchronization may then be used to aid in synchronizing secondary history stores 804 and 808, which in turn aids the synchronization of primary history stores 805 and 809.

Figure 9:
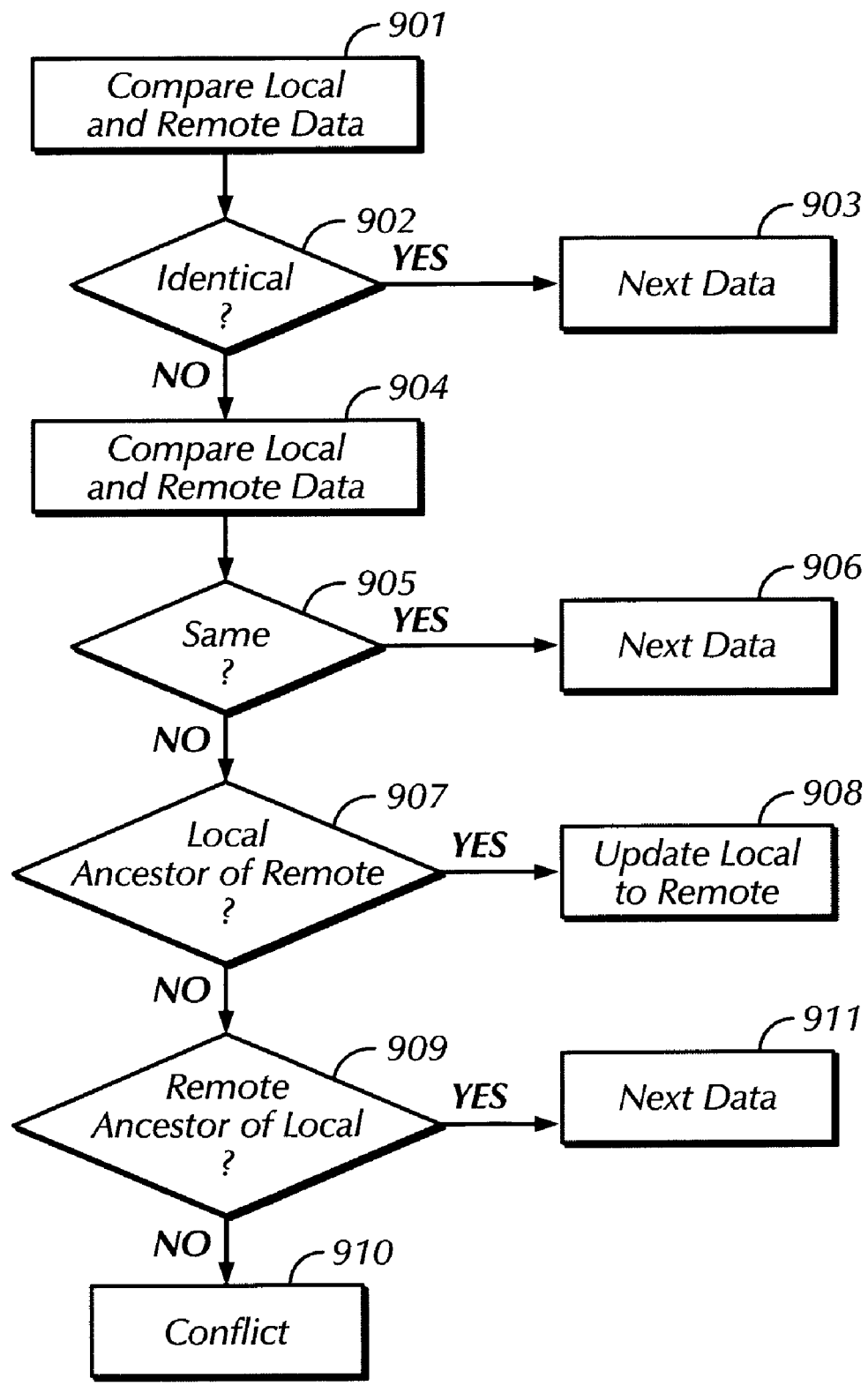
FIG. 9 is an exemplary process for synchronization.

Once the history information has been has been synchronized, all metadata states for the remote data are known locally. Now the data store synchronization may begin with the potential for aid by the new history information. Referring to FIGS. 8 and 9, the general process may be as follows. In step 901, some embodiments may compare the corresponding data items from local device 801 and remote device 802. In those embodiments, if decision 902 determines that the data items are identical, then step 903 dictates that no action is necessary to the local data and we are ready for the next data. If the data is not identical in step 902, then control moves to step 904 to compare states. It is noteworthy that many embodiments will omit the steps 901 and 902 and therefore begin this illustrated process at step 904 by comparing, for the data under consideration, the local state and the remote state. If decision 905 determines that the states are the same, then no further action is required with respect to this data item and control passes to step 906 for the next data. If decision 905 determines that the states are different, then control passes to decision 907 to determine if the local state is an ancestor of the remote state. If decision 907 is yes, this indicates that that the local data is antiquated, and the local data should be updated to reflect the value of the remote data. If decision 907 determination is no, then control shifts to decision 909 to determine if the remote state is an ancestor of the local state. If the decision at step 909 is yes, then we have confirmed that the local state is most recent and control passes to step 911 for the next data item. If the decision 909 is no, then control passes to step 910 and a conflict is generated. There are many potential mechanisms for resolving a conflict. In some embodiments, a user interface is presented so the user may chose between the conflicted data items. Varying embodiments may display some metadata at this point to aid the user. Some potentially useful metadata may be the history of each data item, including to the extent available, the times, devices and users involved in the data manipulations. This metadata may be carried in the history store, the data store or elsewhere. However, if item-specific metadata is carried in the history store, such will tend to cause a large number of history statements.

While one skilled in the art may understand without prompting, it should be noted that the process described with respect to FIG. 9 may be applied to synchronized generation counts, however with potentially more opportunity for conflict generation.

b. An Extensible Semantic Language for History Statements

We have discussed the use of history and history statements at length. We shall now discuss exemplary types of information for uses as history information. In forming the semantics of history statements many embodiments require a syntax that lends itself to machine use. Therefore, in those embodiments, a source code type format may be used in order to provide for computer reading and/or compiling. Some embodiments use the following general syntax New State, Function/Command, Client, Old State(s)

The "New State" is a state identification being assigned on the local device. An "Old State" reflects the prior state of the data, expressed in terms of local states. For a given history statement, both the old and new states may be useful to track ancestry as may be necessary during synchronization as previously described. State identifications needn't be assigned in incremental order. These identifications need only be unique to the environment of their exploitation. For example, in many embodiments, state identification may be unique per client device because there is only a single history store in that device. However, to the extent that data and meta for some class of data may be maintained separately, then state identification may only need be unique for a data class/sync client combination. In addition, in some embodiments, states may be immutable in that they are created once and for all. Of course, then it may be more important for those embodiments to avoid the creation of unnecessary new states and clean up states that are determined to be forever useless.

In our general syntax, the "Client" is an identification of the sync client involved in the change reflected by the history statement. In some embodiments, the client identification is essential in order to accurately track ancestry and limit conflicts to those that are true.

In our general syntax, the "Function/Command" is merely a word (usually a verb) indicative of the nature of the state change. At the time of this application, the inventor has conceived several functions for use in varying embodiments. They are as follows:

The command "external" may be used to establish correspondence between local and remote clients. For example, the statement {12, external, homemachine, 34} indicates that state 12 on the local machine corresponds with state 34 on the "homemachine" sync client. This is useful during synchronization because during the described compare operations, if a data item on the remote is at state 34 and the local state is 12, we know that the states are the same.

The command "user_edited" may be used to indicate that data was changed by a user. For example, {17, user_edited, "ClientB", 14} indicates that the user on client B edited data in state 14, and on the local device, the state for the edited data is state 17. Of course, client B may be the local client, in which case the statement reflects a local data change.

The command "conflict_Resolved" may be used to indicate the result of a conflict resolution. For example, {101, conflict_resolved, homemachine, 37, 38} indicates that data associated with state 37 was found conflicting with that associated with state 38; and that the conflict was resolved on homemachine; the resolution being indicated in local state 101. The order of the conflicting states may be used to indicate more information, such as the winning state and the losing state (e.g. winning state, losing state). As with the foregoing example, a preferred embodiment lists the winning state and the losing state in that order. As discussed earlier there are many techniques for resolving a conflict such as presenting a user interface to receive a user decision.

The command "Known_equal" is used to indicate that two corresponding data items were found to be equal. To be clear, we are referring to whatever is being treated as data, not the meta for that data, such as the state identification. This type of discovery may occur during the compare operations previously described. For example, {100, known_equal, homemachine, 37, 38} indicates that that data items in states 37 and 38 were found to be equal on sync client homemachine and new local state 100 was created to reflect the discovery. Once again, the order of the old states may (but needn't necessarily) be used to convey more information by providing a syntax for this function that specifies, for example, "local state, remote state."

The command "truncated" is used to indicate that a data item has been truncated for some reason (such as discussed earlier). For example, {69, truncated, officemachine, 68} indicates that a remote data item in state 68 was truncated on officemachine in state 68 and is associated with state 69 on the local device.

The command "deleted" indicate that a data item was deleted. For example, {27, deleted, PDA, 26} indicates that data item in state 26 was deleted on sync client PDA and state 27 was created locally to reflect that fact The command "soft_deleted" is used to indicate a data item that was deleted due to something other than a user deletion, such as maximum capacity of a device. For example, {17, soft_deleted, PhoneA, 16} indicates that a data item under state 16 was soft deleted on sync client PhoneA, and local state 17 is used to reflect that fact The "equivalent_states" command is used to record the fact that two states are duplicative. While most embodiments should be designed not to permit duplicate states, they may occur in poorly designed systems or as a result of corruption or other un-planned problems. Nevertheless, when they are found they may be recorded. For example {38, equivalent_states, homemachine, 101, 22} indicates that local states 101 and 22 are equivalent and that fact was found on sync client homemachine. State 38 is used to record that fact and potentially provide for cleaning it up later.

The command "in_use" indicates that states are in use in the data store of a device. For example, {0,in_use, home_machine, 3, 5, 11, 25 26} indicates that the data items existing in the sync client home_machine's data store all correspond to one of the states 3, 5, 11, 25 or 26. In many embodiments, "0" is used as the subject state for in_use command statements. In those embodiments, "0" is only used to maintain syntax with other history statements. As a functional matter, there is no new state necessary to record current states in use. Furthermore, in some embodiments, the in_use command may be primarily exploited for a process called garbage collection, described later. Lastly, in some embodiments, the in_use command will carry a generation count indicating its vintage. In one or more embodiments, the generation count is placed in brackets next to the client name as follows: {0, in_use, home_machine[1], 3, 5, 11, 25 26}

The commands herein described are not intended to be exclusive by their name or function. For example, instead of "know_equal," the same function may be implemented by a command called "same_data" or anything else a programmer wishes. In addition, the sample commands provided herein are intended to be illustrative of command type that may be useful. Varying embodiments may exploit a subset of these commands or even a superset. In particular, many embodiments provide for extensibility of the system. In particular, once built, a system may be upgraded (with software of otherwise) to include other commands without disruption of legacy data or legacy history information. For example, an executable or a library or both may be replaced in order to add new commands and functionality. The new library or executable may be able to interpret the new commands as well as the old commands. This allows a vendor to enhance or increase feature sets without disruption of data or the necessity to re-process all data or history information.

c. Samples

FIG. 10 is a collection of samples created from a program written to demonstrate and test some embodiments of the invention. While the program remains in development, the examples are illustrative of creating history statements using the syntactical language illustrated earlier. For reference and more specific disclosure, the source code for the demonstration program is appended as an exhibit hereto.

Figure 10A:
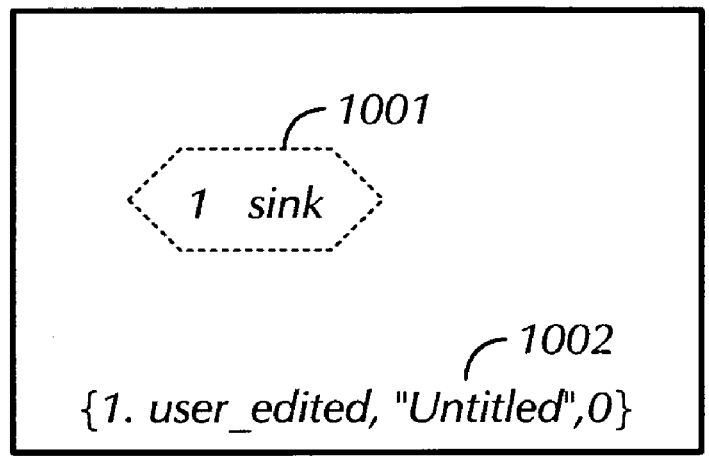
FIGS. 10A 10B, 10C and 10D are exemplary data and corresponding history statements.

Referring to FIG. 10A, there is shown an object 1001 embodying one or more data items (the object may be viewed two ways: as one data item that changes its value by changing shape or internal letters; or as a data set embodying two data items that are visually demonstrated by the shape and the internal letters. The number "1" reflected on object 1001 represents the state of the data. An object created, such as object 1001 is assigned a state ("1"). The data and the state identification ("1") are stored in the data store and a history statement 1002 is created in the history store. In this case, history statement 1002 shows the transition of data item 1001 from state 0 to state 1 through user edit. Obviously then, some embodiments use state 0 to indicate no information is known.

Figure 10B:
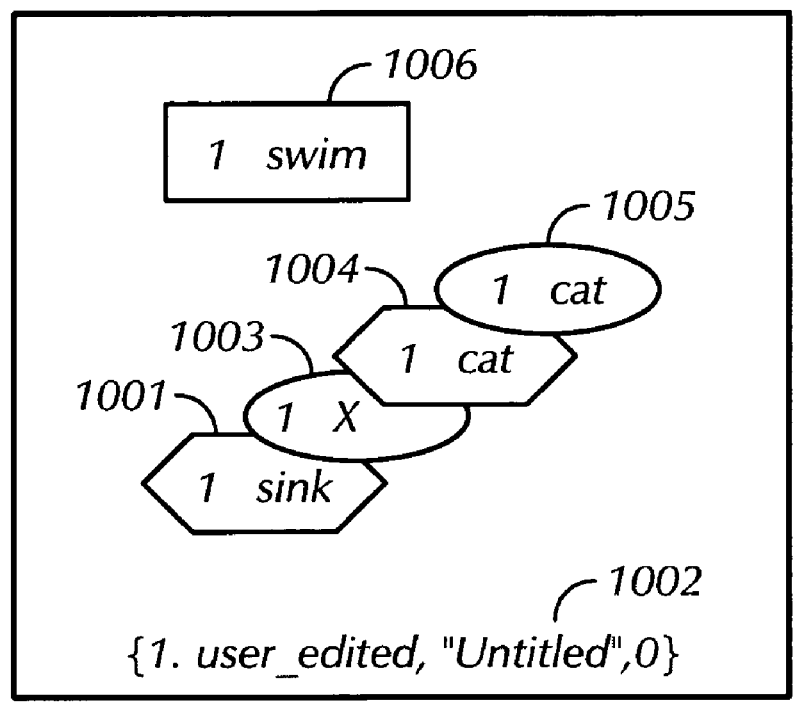

Referring now to FIG. 10B, a continued representation of FIG. 10A is shown. The context has changed in that four objects have been added (1003-1006). Note that no new history statement is necessary because all five objects are described by the single statement (user edited to transition from state 0 to state 1).

Figure 10C:
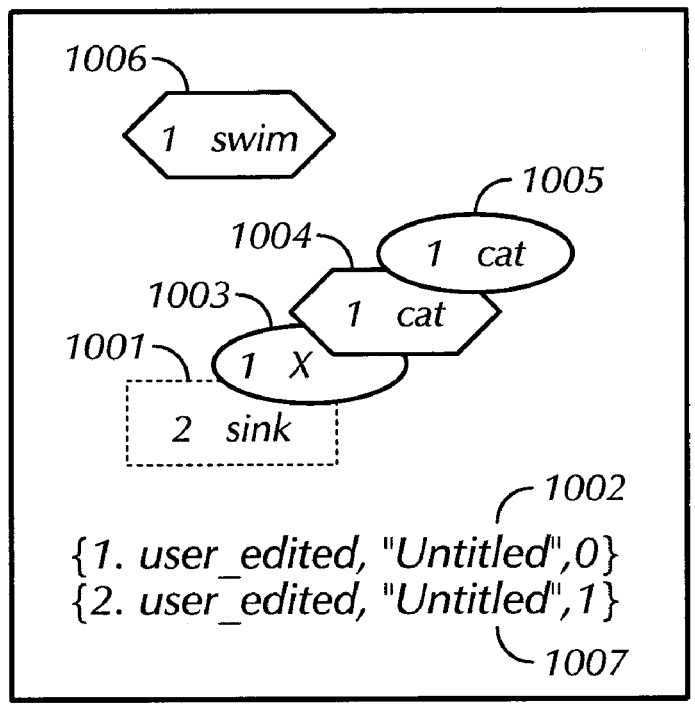

Referring now to FIG. 10C, a continued representation of FIG. 10B is shown. The context has changed in that object 1001 has changed from an oval to a rectangle. This data item change is reflected in the history store in line 1007, which states that the transition from state 1 to state 2 was caused by a user edit. All other objects remain at state 1.

Figure 10D:
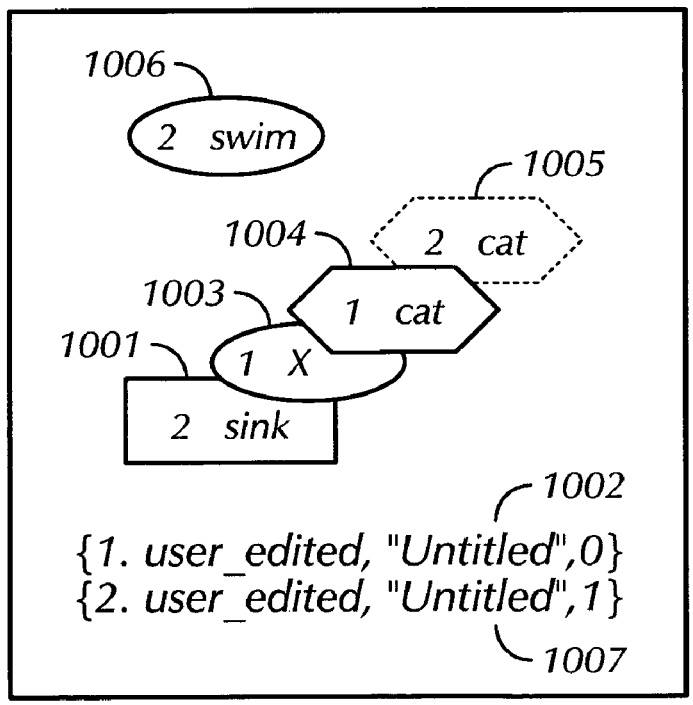

Referring now to FIG. 10D, a continued representation of FIG. 10C is shown. The context has changed in that object 1005 has changed shape and moved to state 2. This is reflected in the history store by line 1007. Note that line 1007 now reflects the same transition for two objects, 1001 and 1005. Similarly, we could edit the remaining three objects and no new states would be created because the two listed states would describe the transitions from state 0 to state 2 for all existing objects.

Figure 11A:
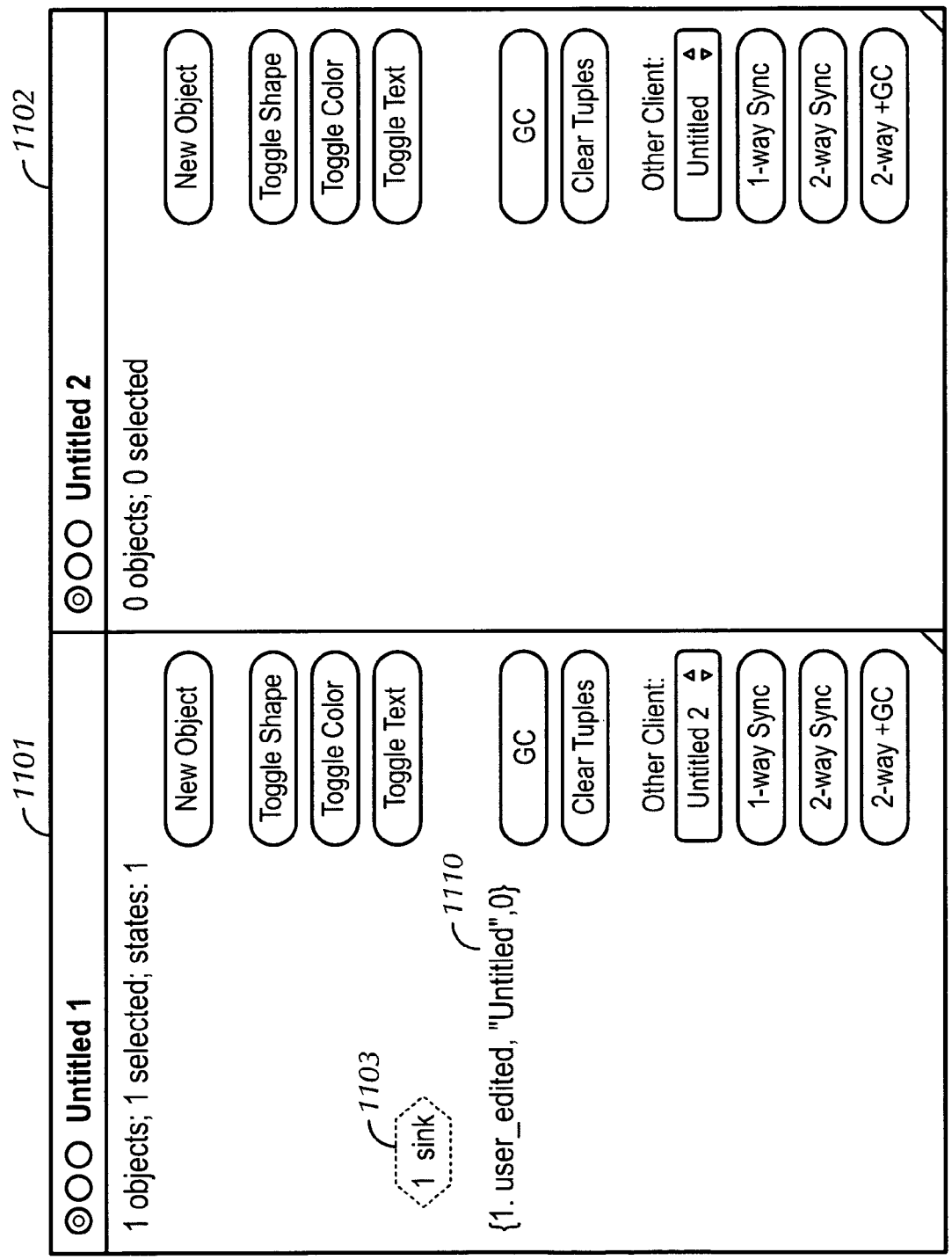
FIGS. 11A, 11B, and 11C are exemplary data and corresponding history statements.

Referring now to FIG. 11A, there is shown a graphical user interface from the aforementioned demonstration program. The UI has two windows 1101 and 1102 indicating client devices "untitled" and "untitled 2" being simulated by the program (device names are at the top of each window). FIG. 11A shows that device "untitled" 1101 has a single object 1103 in its data store and a single corresponding history statement 1110 in its history store.

Figure 11B:
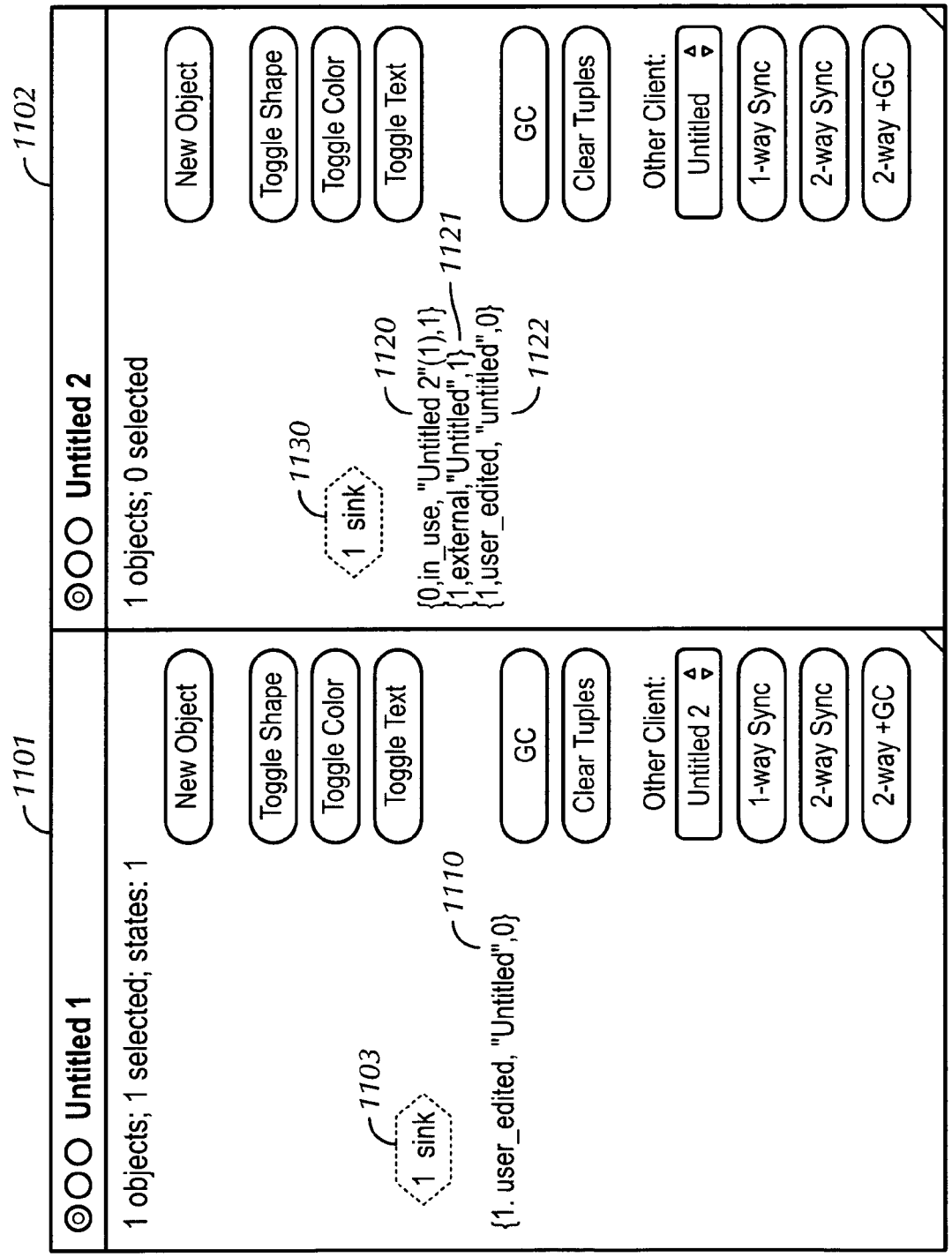

Referring now to FIG. 11B, a continued representation of FIG. 11A is shown. The context has changed in that device 1102 has performed a one way synchronization from device 1101. We see that the synchronization causes device 1102 to put an identical object in its history store. In addition the history statements 1120-1122 reflect the functions discussed earlier. In particular, the in_use command 1120 tells us that state 1 is the only state in use in device 1102's data store. The external command 1121 reflects that local state 1 corresponds to remote state 1 (which is locally represented as state 1). The user edited command 1122 reflects that object 1130 was edited on device "untitled" 1101 from state 0.

Figure 11C:
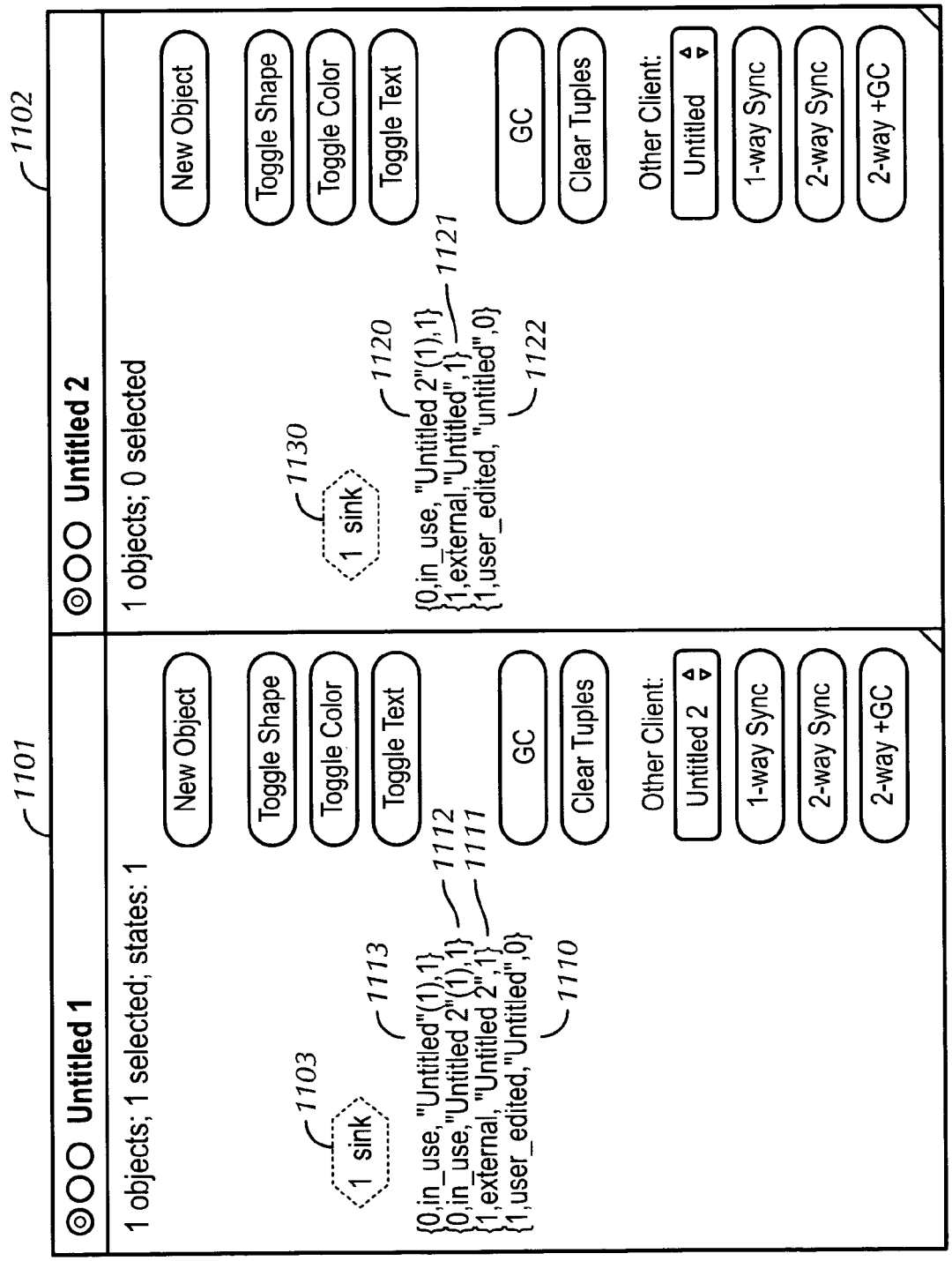

Referring now to FIG. 11C, a continued representation of FIG. 11B is shown. The context has changed in that device 1101 has performed a one way synchronization from device 1102. We see that the data stores have not changed in that objects 1103 and 1130 remain the same and the only objects in their respective devices. However, in synchronizing the history store, we see that three statements have been added to the history store of device 1101 (on the receiving side of the synchronization). In particular lines 1111 through 1113 are new and implemented according to the defining discussions earlier. The in_use command used in lines 1111 and 1113 reflects the states in use in the data stores on each device. The external command 1112 reflects that local state one is equivalent to state 1 on device "untitled 2" 1102.

d. A More Specific Example of Synchronizing History Information

Having generally discussed the synchronization history statements, we shall now provide exemplary synchronization techniques using the example history statements that have been introduced. In synchronizing history statements, many embodiments will synchronize one-way at a time. Therefore, referring to FIG. 7B, if we are attempting to perform a two-way synchronization of history information between device 704 and device 703, we may (i) first incorporate device 704's information into device 703, and (ii) second, incorporate device 703's information into device 704. Of course, the reverse order would work as well. Nevertheless, since these embodiments perform 2-way synchronization by multiply applying a one-way synchronization technique, we shall discuss one-way synchronization.

Figure 12B:
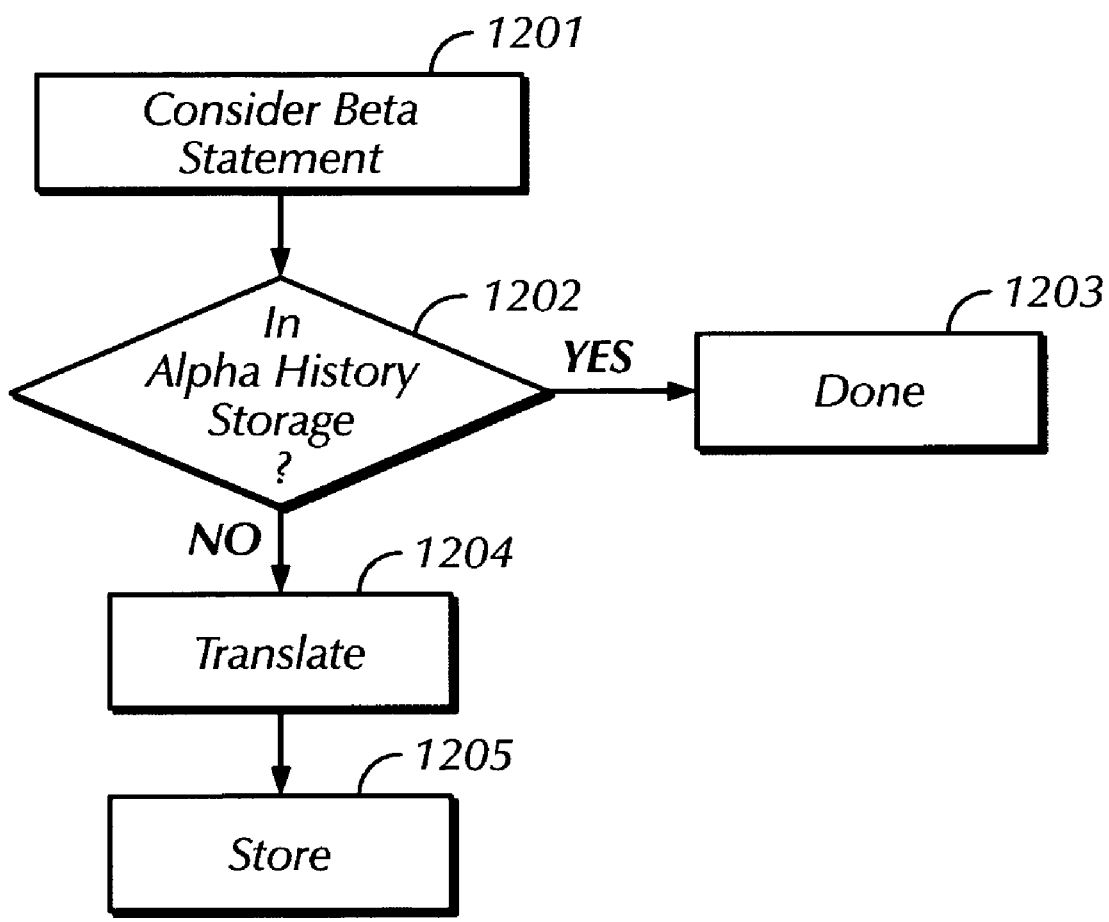
FIG. 12B is an illustration of history synchronization.

Referring to FIG. 12, for illustration, assume that we are synchronizing history information in two devices named "Alpha" and "Beta." In this example, device Alpha is the local target client and device Beta is the remote source client. The effect of the example is to incorporate Beta's history statements into Alpha (i.e. Beta's history store is read-only during this process). In concept, this synchronization is simply the process of ensuring that all the states in Beta have corresponding states in Alpha. This is accomplished by creating new states in Alpha to correspond with any states in Beta for which there are presently no corresponding state. In practice, when a Beta state is identified for incorporation into Alpha, the associated history statement (in Beta) is translated for local usage and added to Alpha's history store. This general process may be conceptualized with respect to the flow chart in FIG. 12B.

Referring to FIG. 12B, a first step 1201 is to consider a history statement represented in Beta's history store. Next, at decision step 1202, we must determine if the examined history statement is already reflected in Alpha's history store. In general, this determination regards whether there is an equivalent history statement or the same information is somehow otherwise existing in the Alpha history store. If the determination 1202 is yes, then the process is over for this state/history statement. If the corresponding state is not found in Alpha, then the process moves to stem 1204 where the Beta statement under consideration is translated for localized use in Alpha. In step 1205, the localized statement is inserted in the Alpha history store or a mapping table for temporary holding.

e. Five Step Synchronization of History

A synchronization process for synchronizing history statements in a remote history store into a local history store may be plainly stated in only three steps as follows: (i) create new local states to correspond to all remote states (using external or equivalent state type commands); (ii) translate all the remote history statements into local a local history statement and place it in the local store (step (i) guarantees all necessary states are present) covert all remote history statements; and (iii) try to eliminate duplicates in the local store. In some embodiments, however, this three step process is comparatively inefficient when compared to a slightly more complex five step synchronization of history statements. We shall discuss the five steps as five passes through the target (e.g. the Beta history store). Each pass is designed to address different types of history statements or different situations. Therefore, each pass may create new history statements for incorporation into Alpha's history store. However, prior to beginning substantive work, logistical provision must be made in the operating environment. For example, in a common computing environment, memory may be allocated and a mapping table or similar data structure may be created. Such a "mapping table" may be used to maintain new Alpha's new history statements, as the list of such statements grows or changes over the five passes. In addition, a table or like structure may be used to maintain information that corresponds with Alpha's new history statements, such as data, other metadata or the Beta-origin history statement.

In the first pass, we examine and translate all "external" command-based history statements in the source (Beta) history store. Therefore, in some embodiments, for each and every "external"-based history statement in the Beta history store (or snapshot of same), we will ensure that we have a corresponding state association in Alpha. For example, referring to FIG. 12, line 1, if there are five "external"-based states reflected in Beta, B1 through B5, then we check to ensure that we have an "External" command in Alpha that establishes an equivalent state in Alpha for each of the 5 states B1 through B5. Assume we find only B1 through B3 in the Alpha history store, using the command nomenclature described earlier, those statements might appear as A1,external,beta,B1

A2,external,beta,B2

A3,external,beta,B3.

Since, in our example, we have found no "external" correspondence for B4 and B5, we may create statements for those states and place them in our table. Referring to FIG. 12, sample new statements appear in line 1, "Device Alpha" column. As seen in FIG. 12, we are creating an external mapping the state of Beta into a state of Alpha. During the first pass, many embodiments ignore history statements in the source (Beta) having both (i) the command in_use and (ii) the target client (Alpha). For example, in those embodiments, we will ignore statements having the following form: AnyState, in_use,Alfpa,AnyState. In these embodiments, the new states_"in_use" for Alpha will be created at the end of the process, if garbage collection is performed.

In the second pass, we process all the history statements in the source (Beta) that may be expressed in existing states of the target (Alpha). As a matter of vocabulary, if a source (Beta) history statement may be expressed using the currently existing target states, then we say that such history statement may be "localized." For any source (Beta) history statements that may be localized, we may perform the localization (expressing the statement using existing local states) and add the new localized history statement to the target (Alpha) mapping table (or history store in other embodiments). Of course, if the localized history statement is already in Alpha's store, then it needn't be added to the mapping table. Furthermore, depending upon the precise algorithm used, it may be unnecessary to fully "localize" a statement before realizing that the localized version is already in the history store. In that case, the localization process may be aborted whenever such realization is made. The following example illustrates this process. For purposes of this example, assume Alpha has existing states A1 through A15, Beta has existing states B1 through B18 and a different peer device Kappa has existing states K1-13. Further assume that the states of Alpha, Beta and Kappa correspond as to numeral (i.e. A1, A2, A3 correspond to B1, B2, B3, correspond to K1, K2, K3 respectively) and that each of Alpha, Beta and Kappa have "external" command statements establishing all existing correspondence. Referring then to FIG. 12, line 2, there are shown in the "condition" column, two history statements for this example of a second pass. Both statements, for the purpose of this example, existing in Beta's data store. The first statement is a user_edited command showing that B5 is the state reflecting a user having edited a state B4 object on the Beta device. As seen in line 2 of the Mapping Table column, this statement easily translates to Alpha state equivalents. This is because Beta states B4, B5, and B10 already have correspondence established on device Alpha (as stated earlier, correspondence may be established through "external" command-based history statements). Similarly, FIG. 12, line 2 shows an example of a history statement comprising a conflict_resolved command.

In some embodiments, the second pass may also attempt to convert source (Beta) history statements that aren't simply localized as described above. Therefore, if a Beta history statement can't be localized, then that statement becomes a candidate for this process. The process is to deduce (with certainty) a relationship between history statements in the source (Beta) and history statements in the target (Alpha). Naturally, the technique for making such deductions varies according to the command at the heart of the history statement. For example, referring to line 3 of FIG. 12, (i) if there is a source (Beta) conflict_resolved statement (e.g. {B16, conflict_resolved,Kappa,B3, B5}); and (ii) if there is a target conflict_resolved statement (e.g.{A9, conflict_resolved, Kappa,A3, A5}); and (iii) as here, there is identity correspondence between winner states (A3 & B3) and loser states (A5 and B5); then (iv) we can deduce that the subject states, B16 and B9 are the same. Having made that deduction, we can ultimately add mapping statements to the mapping table (or, in other embodiments, the target (Alpha) history store). In particular, we have discussed two types of mapping history statements: "external" command statements; and "equivalent_states" command statements. In this case, we use the "external" command if, as a result of the first pass, the correspondence is already in the mapping table (recall that the mapping table is a temporary holding place for new history statements). If the correspondence is not already in the mapping table, we use an "equivalent_states" command.

Before completing the second pass, if there are any new mappings caused by deduced relationships, the second pass is repeated to determine if those new mappings provide information for localizing more source (Beta) history statements.

In the third pass, we process history statements in the source (Beta) history store that, subject excepted, match history statements in the existing target (Alpha) history store. Alternatively stated, we process history statements from the Beta history store, for which we may infer the subject state. These history statements already have equivalents in the Alpha store, but those equivalents are not readily identified because there is no "external" or other statement creating the correspondence between the subject states. For example, referring to FIG. 12, line 4, there are two known_equivalent commands having different subjects (result states A13 and B16) but otherwise equivalent statements. Since the winner states (B3, A3) are the same and the loser states (B5, A5) are the same, we know that the subject states A13 and B16 must also be equivalent. Therefore, we may add a corresponding "external" command as shown in the mapping table column of line 4 (the external command has been used indicating for some embodiments that the correspondence was not found in the mapping table). Before completing the third pass, if there are any new mappings caused by inferred relationships of the third pass, then the second pass is repeated to determine if those new mappings provide information for localizing more source (Beta) history statements.

In the fourth pass, we handle all Beta's history statements that can be localized, subject excepted, i.e. where all states in the Beta history statement except for the subject may be expressed in a current state of Alpha. At this point, we know for any such Beta history statement: (i) its subject can not be localized (because that would have happened in the second pass); and (ii) that the Beta history statement does not match any existing Alpha history statement (from any standpoint, including inference or deduction). We handle these statements by creating a new Alpha state and appending it as the subject to the localized version of the Beta history statement. As an example, see line 5 of FIG. 12 wherein new state "ANEW" is appended to an otherwise matching conflict_resolved history statement. Furthermore, we create a new mapping statement establishing correspondence between the newly created state (ANEW) and the Beta subject state that couldn't be localized earlier (see example in line 4 of FIG. 12). Our convention for using an "external" or "equivalent_states" commands remains the same as suggested earlier (use external if the association is not already in the mapping table). In addition, as before, if we have created any new mappings in pass 4, we retry pass 2 because new mappings may result in our ability to localize new Beta history statements.

In the fifth and final pass, we process each remaining source (Beta) history statement as follows: (i) ignore remaining statements with a subject that is either 0 or already mapped in the mapping table; (ii) ignore "external" commands that remain (because we don't want to waste processing time or space learning states that are not necessary); (iii) create a new target (Alpha) state for each state in the source (Beta) history that is not already mapped; and (iv) create a target (Alpha) history statement analogous to the Beta statement but using the newly created Alpha states. For an example, see line 6, FIG. 12 wherein there is shown pass 5 conversion on the Beta history statement, {B18, conflict_resolved, Kappa, B17, B16} (assuming that Alpha has no corresponding states for B16, B17 or B18). As shown in line 5, new Apha states ANEW1, ANEW2 and ANEW3 are created for B16-B18 respectively. In addition, the Beta conflict resolved statement is translated using the newly created Alpha states.

As in the other cases, if pass 5 has created any new mappings, we retry pass 2 because new mappings may result in our ability to localize new Beta history statements.

At the end of pass 5, all Beta history statements of concern should have been processed.

f. Garbage Collection

As stated earlier, it may be desirable to minimize the number of history statements to conserve system resources and increase performance. Therefore, some embodiments use a garbage collection process to eliminate unnecessary history statements. Garbage collection is the process of evaluating the history statements in a history store in order to determine if any can be deleted (because they are unnecessary to the function of the system). Generally in order to effect garbage collection, each client keeps track of the states in use on every other client and only garbage collects states that are known useless on all known clients. In greater particularity, a sample process is as follows.

(i) Keep Track of States in Use

Figure 13A:
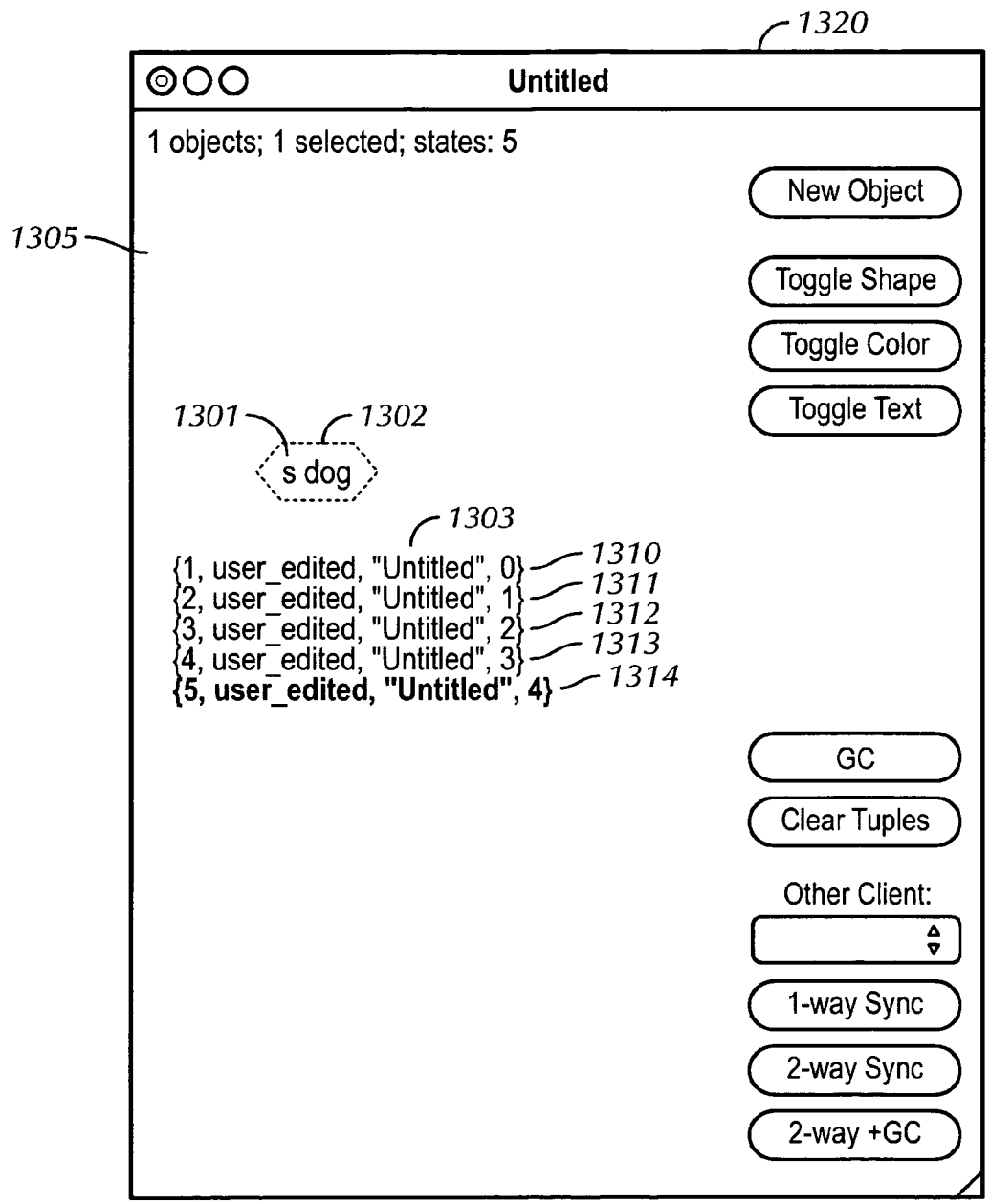
FIGS. 13A, 13B and 13C are sample uses of history statements.
Figure 13B:
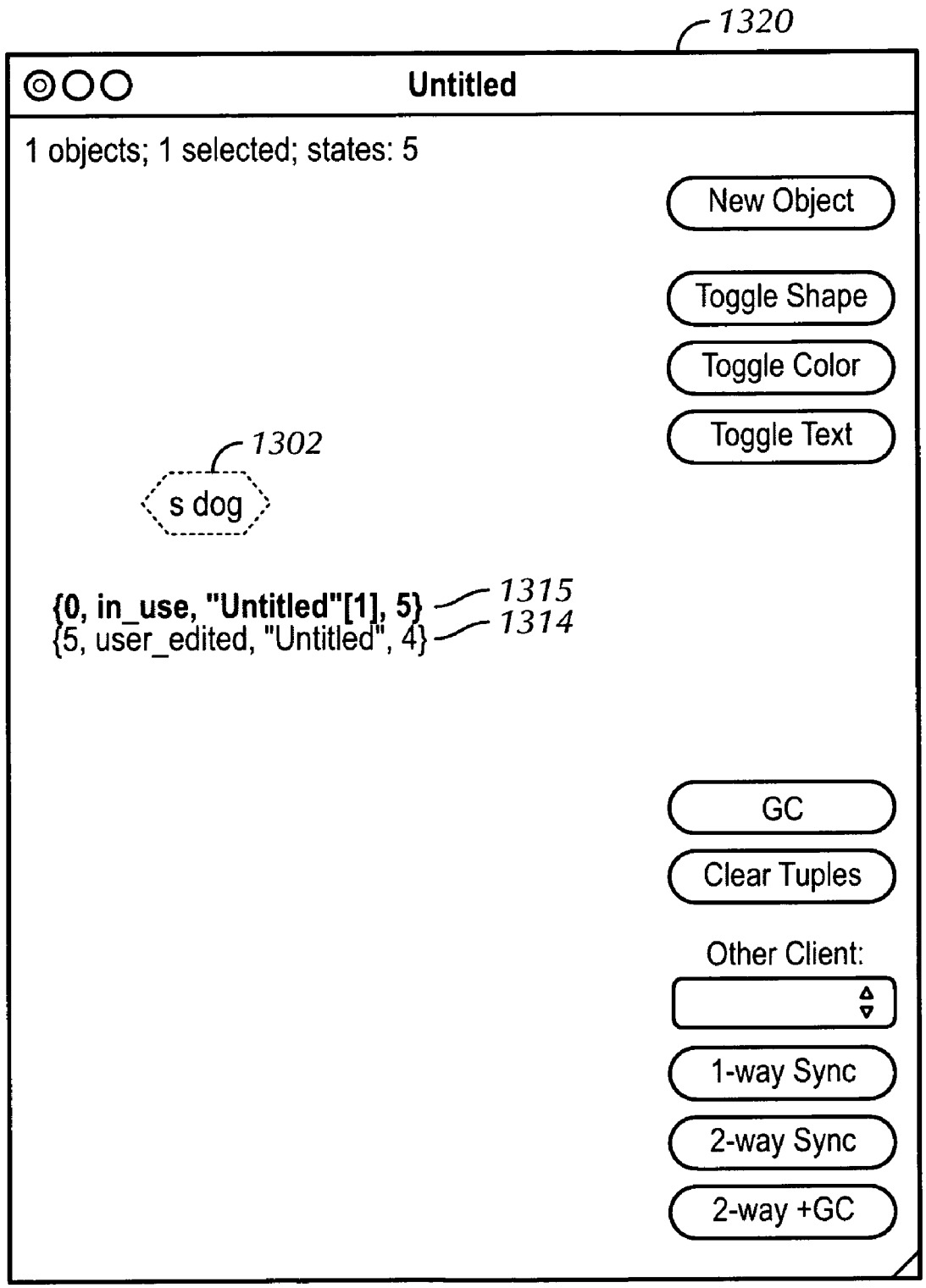

Foremost, each client may keep track of all the states that are in-use for itself and each known peer sync client. In brief, a state is in-use if it is being used to represent an object in the data store. For example, referring to FIG. 13A, there a single object (Dog) 1302 in the data store. As indicated by the FIG. 1301, the object Dog is at state 5 because, as shown in history store 1303, the object was created (causing a first history statement) and then user edited 4 times (each edit causing a new history statement). However, for garbage collection purposes, only state 5 is in-use in the data store 1305. Assuming the object Dog 1302 is the only object in our extended system (all data, all sync clients) at the moment, then it is intuitive that history statements 1310 through 1313 are unnecessary (it doesn't matter how many times we edited the object Dog if we never told another client about those edits). Therefore, referring to FIG. 13B, there is shown the result of garbage collection on the sync client of 13A in the system as assumed. As we see in FIG. 13B, history statements 1310 through 1313 have been deleted leaving only statement 1314 (with subject 5—the only subject state used in the data store). Furthermore, history statement 1315 has been added to record the facts that state 5 is in-use on the client "untitled" 1320 and that the "user_edited" command for untitled is in its first generation ("[1]").

Figure 13C:
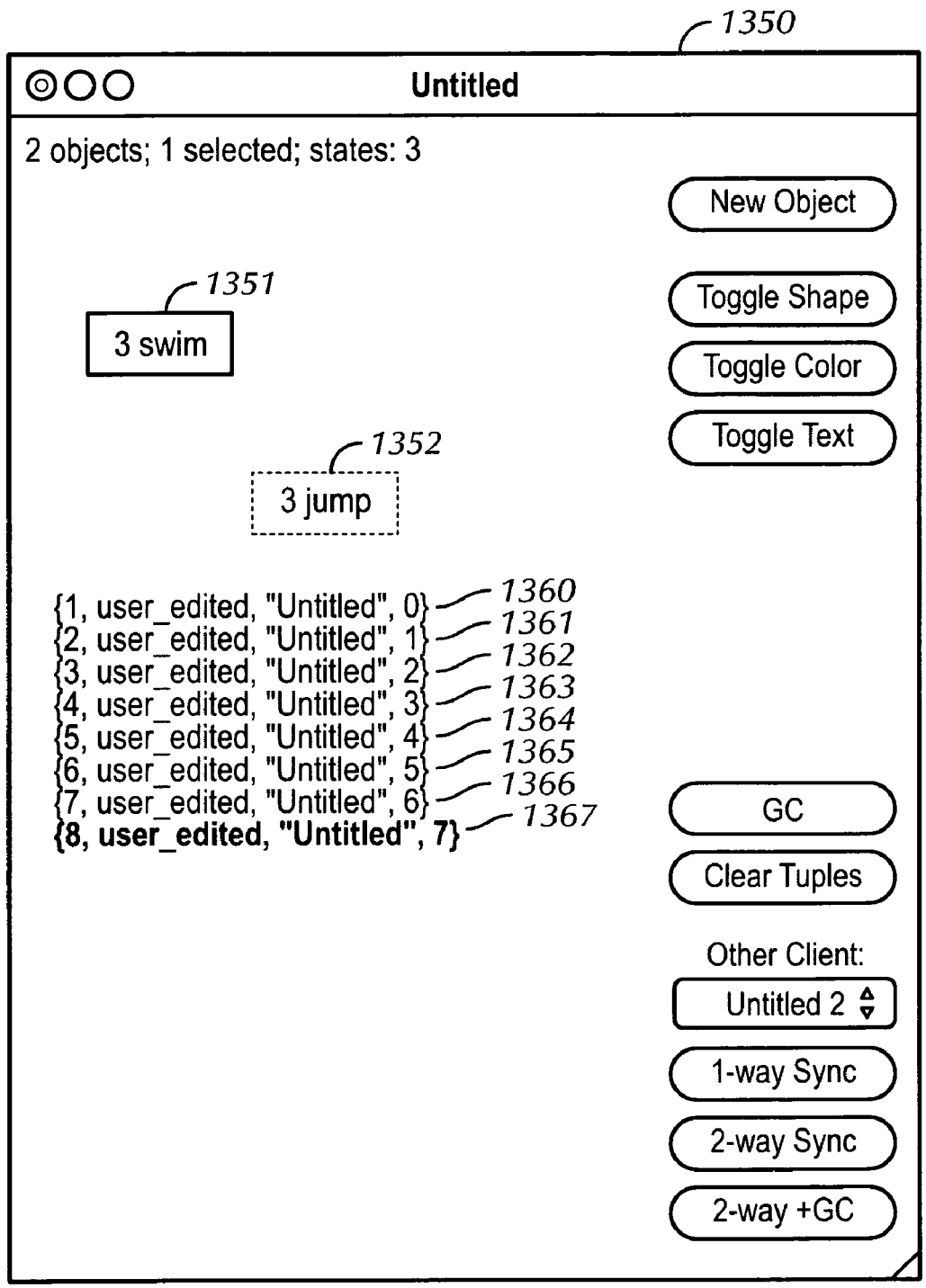

Referring to FIG. 13C, there is shown another example to illustrate a state in use. In particular, FIG. 13C shows two objects 1351 and 1352 in the data store. In this case, first object 1351 was created and then edited seven times (thus it is at state 8). Then, object 1352 was created and edited twice (thus it is at state 3). Therefore, states 8 and 3 are in use for client "untitled" 1350.

Lastly, with respect to keeping track of the states in use, there is a question regarding how, or perhaps when such information is tracked. A client may keep dynamic track of its states in use by re-calculating the information each time there is a change in the data store. Alternatively, a client may calculate its states in use at the time it performs a garbage collection or at the time it performs a synchronization.

(ii) Necessary History Statements

Figure 14A:
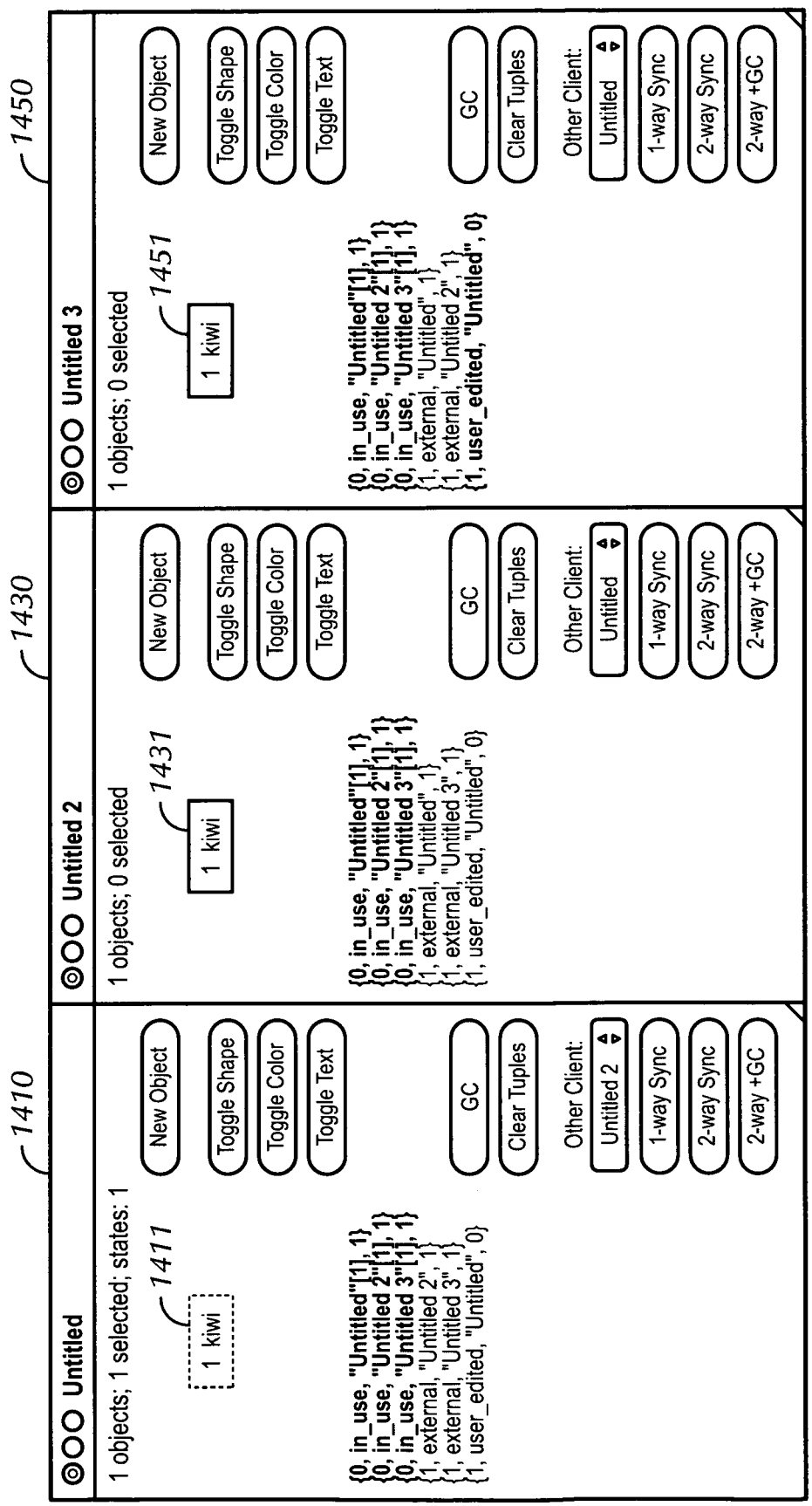
FIGS. 14A, 14B, 14C, 14D and 14E are samples illustrating garbage collection of history statements.
Figure 14B:
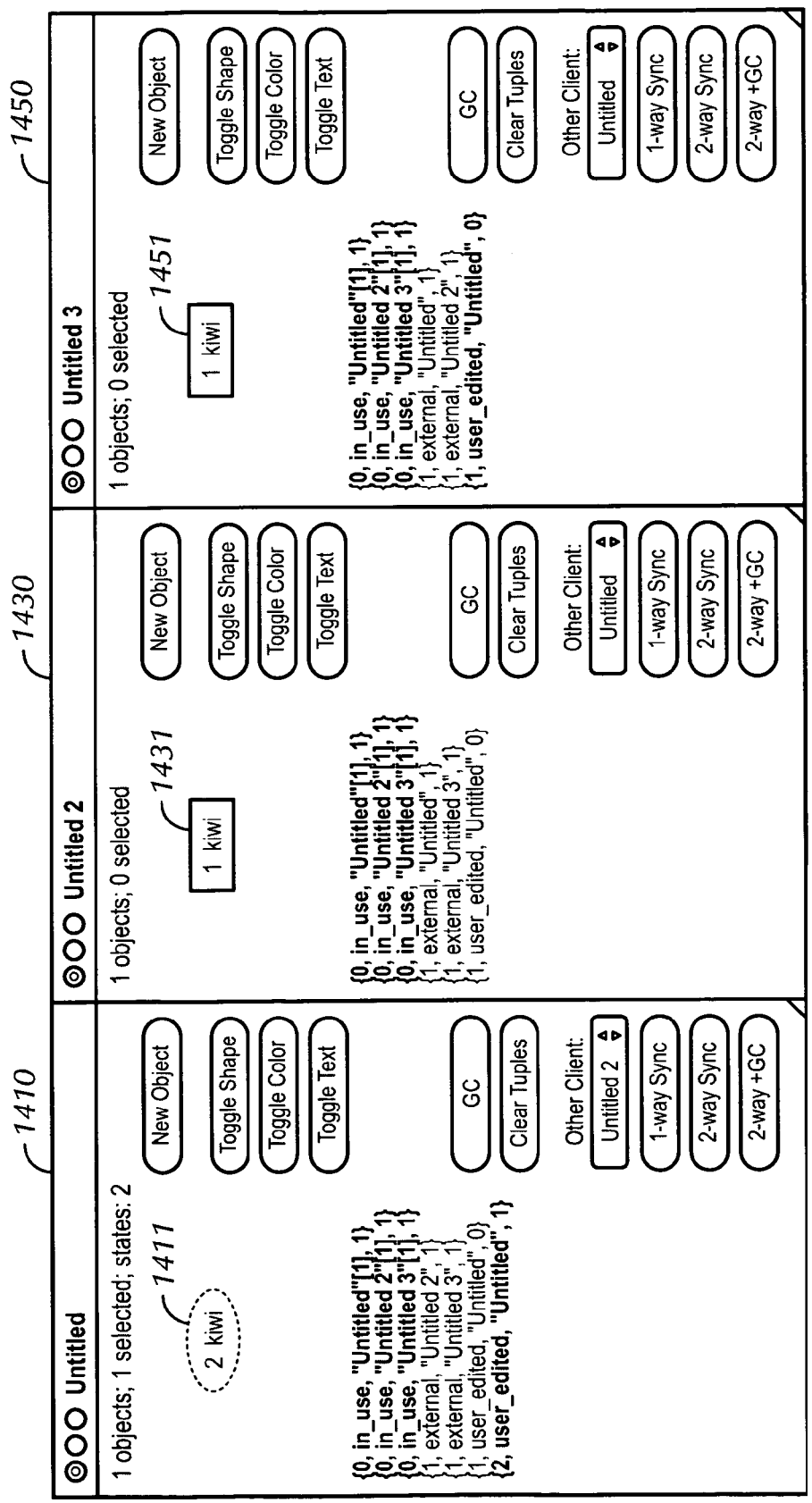
Figure 14C:
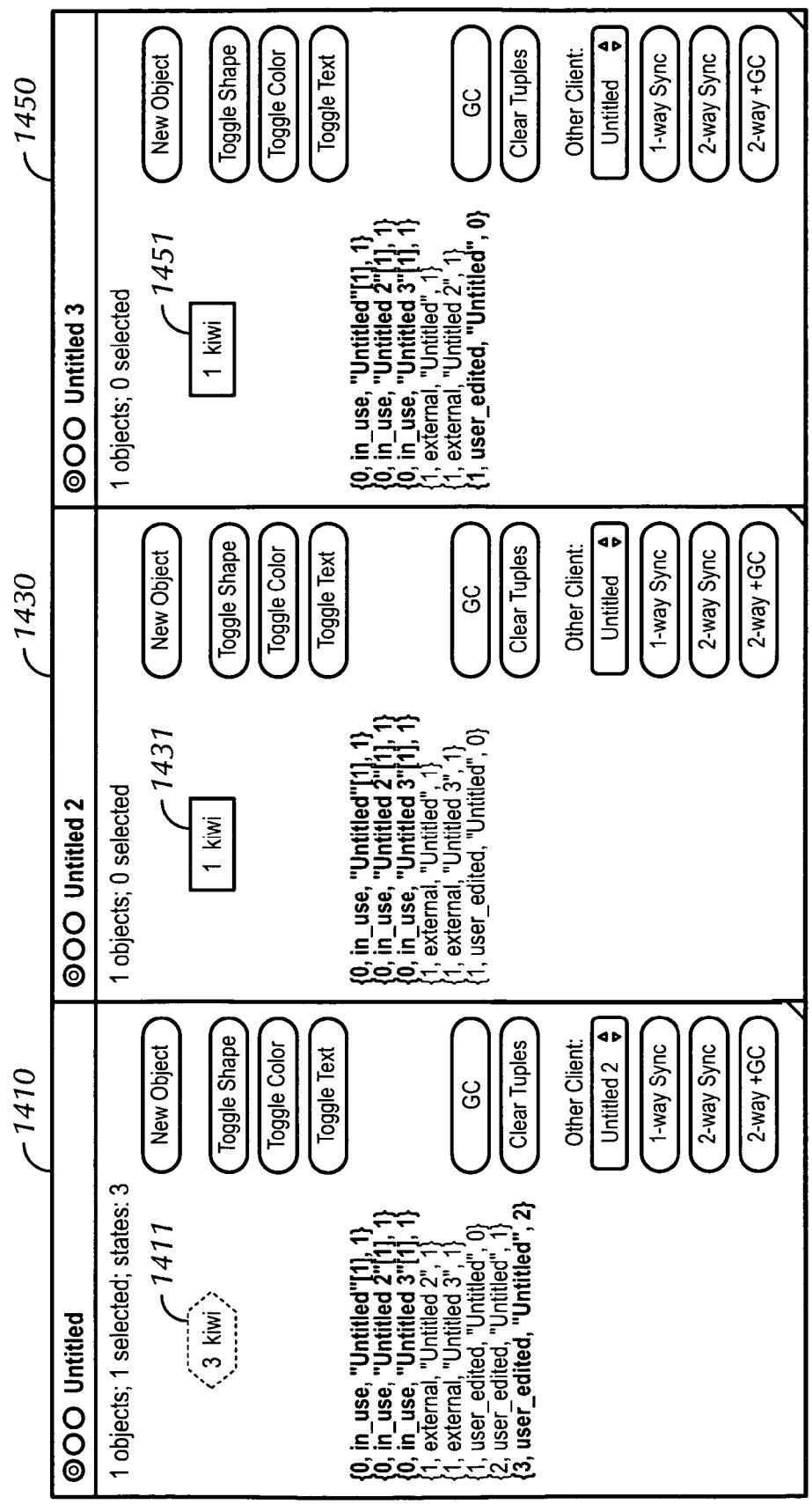
Figure 14D:
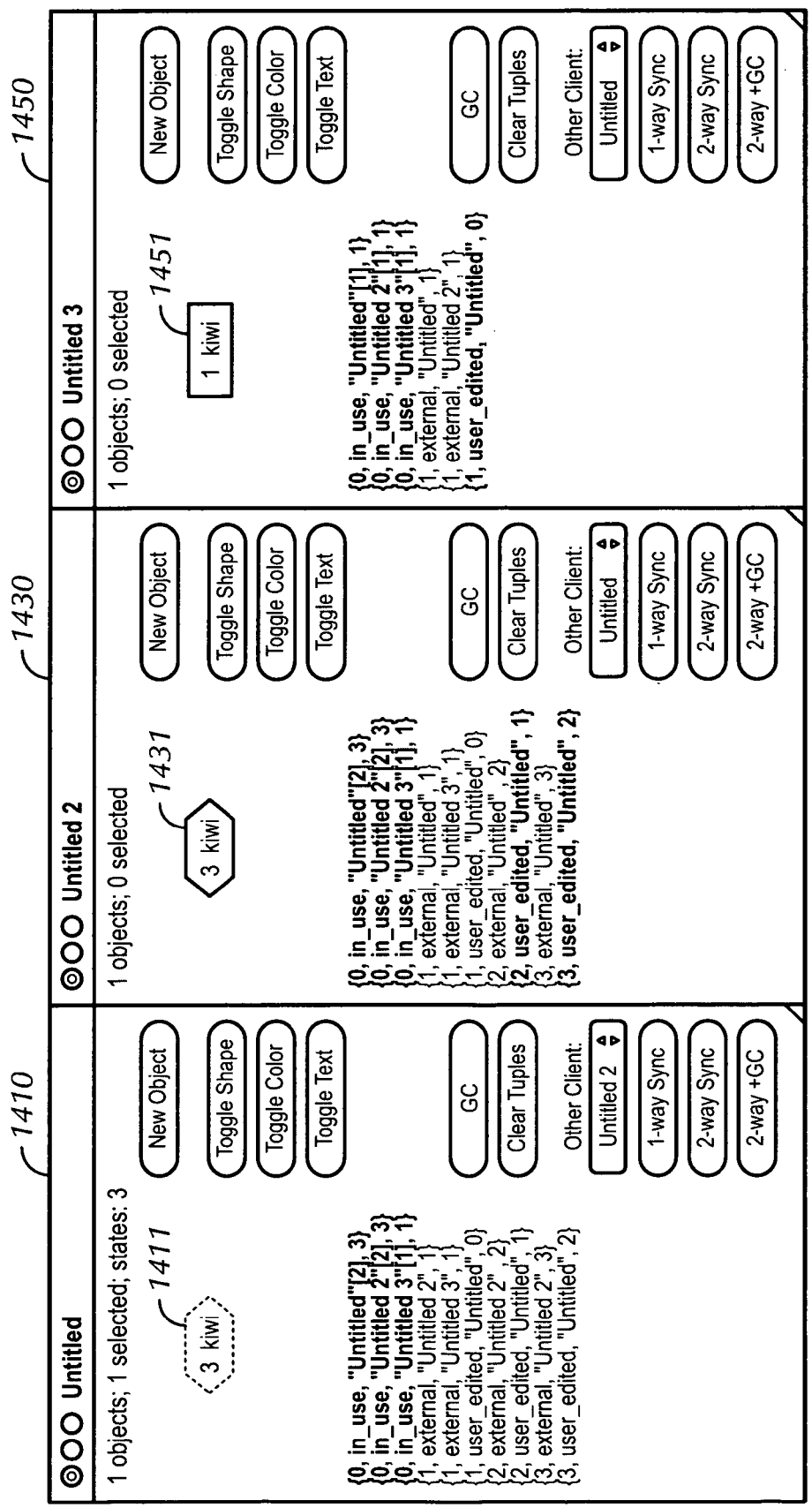
Figure 14E:
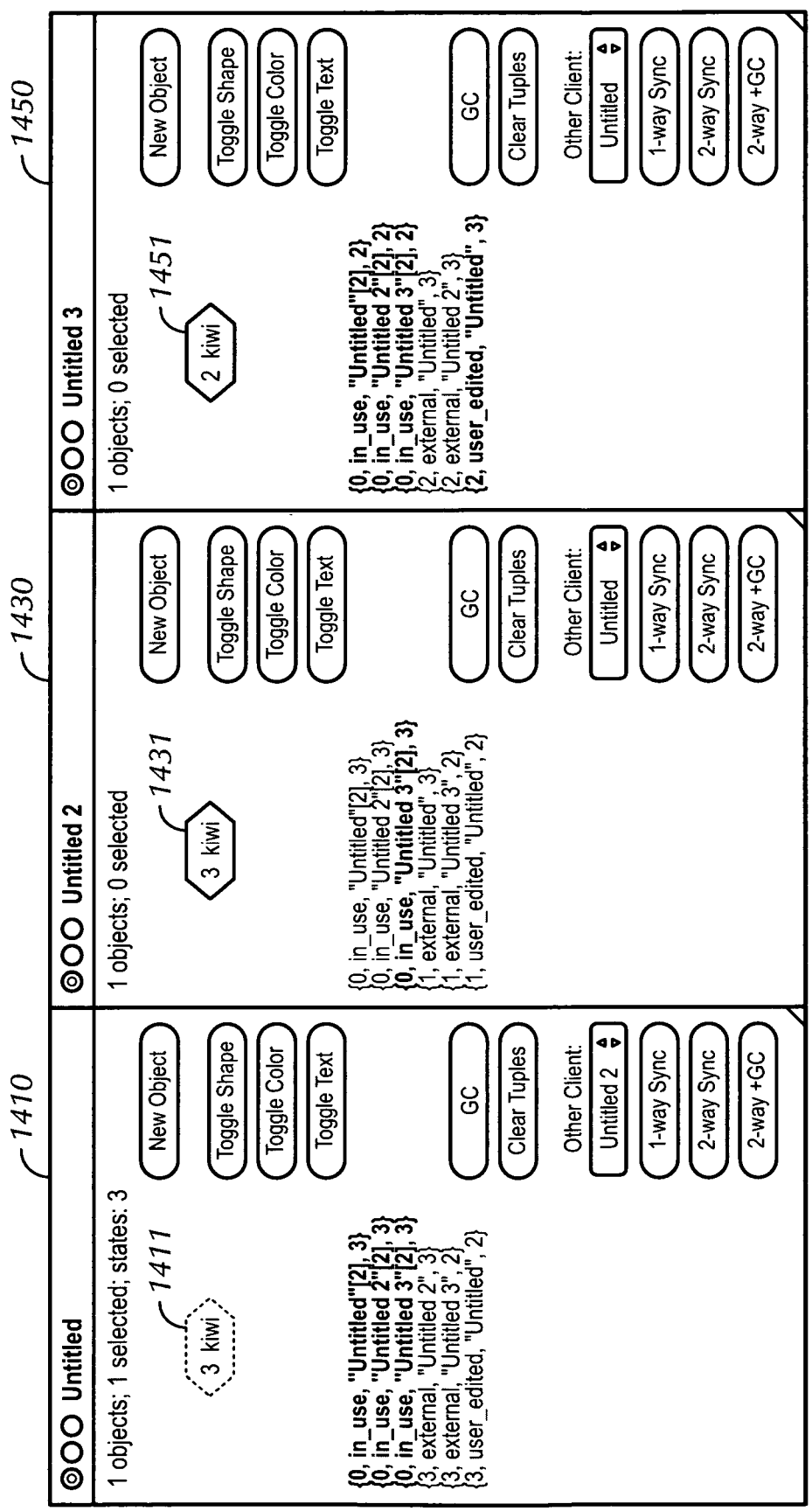

In addition to keeping track of states in use, there must also be a mechanism for understanding which history statements are necessary for which clients, given a specified set of states in use. Every time there is data change on a given client, one may calculate which history statements are necessary to each and every known client. If a history statement is necessary to any known client then it must be kept. For example, referring to FIG. 14A, there is shown a synchronization system having 3 clients 1410, 1430 and 1450. Referring to FIG. 14A and rows one and two of the chart in FIG. 15, there is a single object that was created in client 1410 and synchronization has occurred among and between all clients. Referring then to FIG. 14B and row 3 of FIG. 15, client 1410 edits data 1411, and the edit is reflected in both the data store and the history store (state 2 in 1410). As we see in the comments of FIG. 15 (row 3), all clients need to know about this data edit (to state 2) so it must be maintained. However, client 1410 no longer needs state 1 history statements, but must maintain same because it knows about the existence of clients 1430 and 1450 and doesn't know if they need that change. Referring to FIG. 14C and FIG. 15, row 4, we now edit the data object 1411 again, moving it to state 3 and creating a corresponding history statement. Referring then to the comments in FIG. 15, row 4, all clients 1410, 1430 and, 1450 require this change (state 3), so it is maintained. However, client 1410 really no longer needs state 2 (the change to A') but must maintain the related history statements because clients 1430 and 1450 may need it. Referring now to FIG. 14D and row 5 of FIG. 15. now we have synchronized clients 1410 and 1430. We see in the comments of row 5 that both 1410 and 1430 no longer require state 2 or State 1 but keep it due to their knowledge that 1430 exists and may need that state. Finally then, we move to FIG. 14E and row 6 of FIG. 15, now we synchronize all three clients and garbage collect. Since we are now certain the states 1 and 2 are obviated, history statements having subject states 1 or 2, may be eliminated. Therefore, we see that a client may release a state (any history statements with that state as a subject) as soon that client is certain that all other known clients do not require the released state.

(iii) Sharing/Syncing in-Use Information

Finally, we may have a mechanism for sharing this information with other clients (how does a particular client know what each other client may need). As seen in FIGS. 14A through 14E, this mechanism is a history statement using the "in_use" command. As noted earlier, an in_use history statement may carry all of the following information: a subject state indicator (which is always "0"); the in_use command, a generation count (shown in brackets in examples) because only the most recent in_use command is relevant for a given sync client; and finally, a list of the states in use. By maintaining and synchronizing these in-use statements, each client can know what states were in use on the other know devices, the last time they connected (an presumably 2-way synchronized and garbage collected). This is how client 1410 (in the example above) could know not to throw away states 1 and 2 until it was verified that both devices 1430 and 1450 did not require these states. Therefore, in some embodiments, the in_use history statement must be synchronized onto other sync clients so that those other sync clients do not dispose of states that are necessary on another client.

Thus, stated generally, for a given client that has connected to (i.e knows about) N other clients (maybe transitively) you have N sets of in-use states reflected in in-use statements. These in-use states and their descendants (opposite of ancestors) are the states that may be relevant for that group of N clients. All the other states can be thrown away. Typically, when you connect with another client, you may determine some group of ancestors mutually irrelevant (such as in line 6, FIG. 15)—therein lies an opportunity to garbage collect.

The foregoing embodiments are intended as illustrative and without limitation unless expressly stated. One skilled in the art may adapt these embodiments and illustrations in a variety of ways. Such adaptation is expected and intended as part of the discussion herein.

What is claimed is:

1. A method of maintaining meta data regarding user activity for synchronization of related data items based on reusable state descriptions, the reusable state descriptions comprising indications of state transitions of one or more data items based on user actions affecting versions of the one or more data items and user action history reflecting user actions affecting versions of the one or more data items, the method comprising the steps of:

making a first meta data activity association between a first reusable state description and a related first version of a first data item stored on a first device, wherein the first reusable state description reflects a first state transition of the first version of the first data item, based on a user action affecting the first version of the first data item and comprises user action history reflecting the user action affecting the first version of the first data item;

storing an indication of the first meta data activity association on the first device;

making a second meta data activity association between the first reusable state description and a second data item stored on the first device, after the second data item has undergone the first state transition based on the user action affecting the second data item;

storing an indication of the second meta data activity association on the first device;

storing a second reusable state description on the first device, the second reusable state description being distinct from the first reusable state description and reflecting a state transition of a third data item and comprises user action history reflecting user action affecting the third data item;

storing a third reusable state description on the first device, the third reusable state description being distinct from the first reusable state description and distinct from the second reusable state description, the third reusable state description reflecting a state transition of a fourth data item and comprises user action history reflecting user action affecting the fourth data item;

using the first reusable state description, the second reusable state description, and the third reusable state description to facilitate synchronizing a synchronization data item stored on the first device;

determining synchronization of the synchronization data item to be in conflict, and in the situation of conflict, determining whether one version of the synchronization data item is an ancestor of another version of the synchronization data item, wherein determining whether one version is an ancestor of another comprises:
determining if the reusable state descriptions are the same for a local version of a synchronization first data item and a remote version of the synchronization data item,
if the reusable state descriptions are the same then update is not required between the local version of the synchronization data item and the remote version of the synchronization data item;
else determining from the reusable state descriptions if the local version of the synchronization data item is an ancestor of the remote version of the synchronization data item or if the remote version of the synchronization data item is an ancestor of the local version of the synchronization data item,
if the local version of the synchronization data item is an ancestor of the remote version of the synchronization data item then determining that update between the local version of the synchronization data item and the remote version of the synchronization data item is required, and
if the remote version of the synchronization data item is an ancestor of the local version of the synchronization data item then determining that update between the local version of the synchronization data item and the remote version of the synchronization data item is not required.

2. The method of 1 wherein the user action is selected from the group consisting of: creation of data; editing of data; deleting data; and synchronizing data.

3. The method of 1 wherein the stored indication of the first meta data activity association on a first device comprises the identity of the device where user action occurred.

4. A system for maintaining meta data regarding user activity for synchronization of related data items based on reusable state descriptions, the reusable state descriptions comprising indications of state transitions of one or more data items based on user actions affecting versions of the one or more data items and user action history reflecting user actions affecting versions of the one or more data items, the system comprising:
one or more processors and memory wherein the one or more processors are configured to execute one or more functions to:
make a first meta data activity association between a first reusable state description and a related first version of a first data item stored on a first device, wherein the first reusable state description reflects a first state transition of the first version of the first data item, based on a user action affecting the first version of the first data item and comprises user action history reflecting the user action affecting the first version of the first data item;
store an indication of the first meta data activity association on the first device;
make a second meta data activity association between the first reusable state description and a second data item stored on the first device, after the second data item has undergone the first state transition based on the user action affecting the second data item;
store an indication of the second meta data activity association on the first device;
store a second reusable state description on the first device, the second reusable state description being distinct from the first reusable state description and reflecting a state transition of a third data item and comprises user action history reflecting user action affecting the third data item;
store a third reusable state description on the first device, the third reusable state description being distinct from the first reusable state description and distinct from the second reusable state description, the third reusable state description reflecting a state transition of a fourth data item and comprises user action history reflecting user action affecting the fourth data item;
use the first reusable state description, the second reusable state description, and the third reusable state description to facilitate synchronizing a synchronization data item stored on the first device;
determine synchronization of the synchronization data item to be in conflict, and in the situation of conflict, determining whether one version of the synchronization data item is an ancestor of another version of the synchronization data item, wherein determining whether one version is an ancestor of another comprises:
determining if the reusable state descriptions are the same for a local version of a synchronization data item and a remote version of the synchronization data item,
if the reusable state descriptions are the same then update is not required between the local version of the synchronization data item and the remote version of the synchronization data item;
else determining from the reusable state descriptions if the local version of the synchronization data item is an ancestor of the remote version of the synchronization data item or if the remote version of the synchronization data item is an ancestor of the local version of the synchronization data item,
if the local version of the synchronization data item is an ancestor of the remote version of the synchronization data item then determining that update between the local version of the synchronization data item and the remote version of the synchronization data item is required, and
if the remote version of the synchronization data item is an ancestor of the local version of the synchronization data item then determining that update between the local version of the synchronization data item and the remote version of the synchronization data item is not required.

5. The system of claim 4 wherein the user action is selected from the group consisting of: creation of data; editing of data; deleting data; and synchronizing data.

6. The system of 4 wherein the stored indication of the first meta data activity association on a first device comprises the identity of the device where user action occurred.

* * * * *

UNITED STATES PATENT AND TRADEMARK OFFICE
CERTIFICATE OF CORRECTION

| | | |
|---|---|---|
| PATENT NO. | : 7,730,026 B2 | |
| APPLICATION NO. | : 10/883541 | |
| DATED | : June 1, 2010 | |
| INVENTOR(S) | : Bertrand Serlet | |

It is certified that error appears in the above-identified patent and that said Letters Patent is hereby corrected as shown below:

In column 4, line 4, after "chart" insert -- . --.

In column 6, line 39, after "stack" insert -- . --.

In column 7, line 48, delete "contusion;" and insert -- confusion; --, therefor.

In column 11, line 51, after "syntax" insert -- . --.

In column 12, line 63, after "fact" insert -- . --.

In column 13, line 2, after "fact" insert -- . --.

In column 13, line 28, after "26}" insert -- . --.

In column 19, line 39, delete "and," and insert -- , and --, therefor.

In column 21, line 6, in Claim 1, before "data" delete "first".

Signed and Sealed this
Twenty-ninth Day of November, 2011

David J. Kappos
*Director of the United States Patent and Trademark Office*